(12) United States Patent
Schultz et al.

(10) Patent No.: US 10,757,127 B2
(45) Date of Patent: *Aug. 25, 2020

(54) PROBABILISTIC MODEL FOR CYBER RISK FORECASTING

(71) Applicant: Neo Prime, LLC, Wilmington, DE (US)

(72) Inventors: Craig A Schultz, Danville, CA (US); John J. Nitao, Castro Valley, CA (US); Jeffrey M. Starr, Springfield, VA (US); John Compton, Hayward, CA (US)

(73) Assignee: Neo Prime, LLC, Wilmington, DE (US)

( * ) Notice: Subject to any disclaimer, the term of this patent is extended or adjusted under 35 U.S.C. 154(b) by 693 days.

This patent is subject to a terminal disclaimer.

(21) Appl. No.: 15/618,809

(22) Filed: Jun. 9, 2017

(65) Prior Publication Data
US 2017/0279843 A1 Sep. 28, 2017

Related U.S. Application Data

(63) Continuation of application No. 14/319,994, filed on Jun. 30, 2014, now Pat. No. 9,680,855.

(51) Int. Cl.
| H04L 29/06 | (2006.01) |
| G06Q 10/06 | (2012.01) |
| G09C 1/00 | (2006.01) |
| G06Q 40/08 | (2012.01) |

(52) U.S. Cl.
CPC ..... *H04L 63/1433* (2013.01); *G06Q 10/0635* (2013.01); *G06Q 40/08* (2013.01); *G09C 1/00* (2013.01); *H04L 63/14* (2013.01)

(58) Field of Classification Search
None
See application file for complete search history.

(56) References Cited

U.S. PATENT DOCUMENTS

6,952,779 B1 10/2005 Cohen et al.
7,096,502 B1 8/2006 Fox et al.
(Continued)

FOREIGN PATENT DOCUMENTS

CN 101075917 B 8/2010
WO WO-2000070463 A1 11/2000

OTHER PUBLICATIONS

Dudorov, Dmitry, David Stupples, and Martin Newby. "Probability analysis of cyber attack paths against business and commercial enterprise systems." In Intelligence and Security Informatics Conference (EISIC), 2013 European, pp. 38-44. IEEE, 2013. (Year: 2013).*

(Continued)

*Primary Examiner* — Mehmet Yesildag
(74) *Attorney, Agent, or Firm* — Perkins Coie LLP

(57) ABSTRACT

A system and method are presented for forecasting the risk of cyber-attacks on targeted networks. The described technology quantifies linear and non-linear damages to network-dependent assets by propagating probabilistic distributions of events in sequence and time in order to forecast damages over specified periods. Damage-forecasts are used to estimate probabilistically time-varying financial losses for cyber-attacks. The described technology incorporates quantities and dependencies for pricing insurance, re-insurance, and self-insurance, assessing cost-benefit tradeoffs for sequenced implementation of security control measures, and detecting attacks in the targeted network.

20 Claims, 25 Drawing Sheets

(56) References Cited

U.S. PATENT DOCUMENTS

| | | | |
|---|---|---|---|
| 7,480,715 | B1 | 1/2009 | Barker et al. |
| 7,530,105 | B2 | 5/2009 | Gilbert et al. |
| 7,961,633 | B2 | 6/2011 | Shankar et al. |
| 7,971,252 | B2 | 6/2011 | Lippmann et al. |
| 8,464,346 | B2 | 6/2013 | Barai et al. |
| 8,490,193 | B2 | 7/2013 | Sarraute Yamada et al. |
| 8,490,196 | B2 | 7/2013 | Lucangeli Obes et al. |
| 2002/0166063 | A1 | 11/2002 | Lachman et al. |
| 2003/0028803 | A1 | 2/2003 | Bunker et al. |
| 2003/0056116 | A1 | 3/2003 | Bunker et al. |
| 2003/0212910 | A1 | 11/2003 | Rowland et al. |
| 2005/0096944 | A1* | 5/2005 | Ryan .................. G06Q 40/08 705/4 |
| 2005/0131828 | A1 | 6/2005 | Gearhart |
| 2005/0216181 | A1* | 9/2005 | Estkowski ............ G08G 1/164 701/411 |
| 2006/0021050 | A1 | 1/2006 | Cook et al. |
| 2008/0082380 | A1 | 4/2008 | Stephenson |
| 2009/0126023 | A1* | 5/2009 | Yun ..................... G06F 21/577 726/25 |
| 2009/0138309 | A1 | 5/2009 | Reynolds et al. |
| 2009/0307777 | A1 | 12/2009 | He et al. |
| 2010/0306852 | A1 | 12/2010 | Adar |
| 2011/0185432 | A1 | 7/2011 | Sandoval et al. |
| 2011/0214187 | A1 | 9/2011 | Wittenstein et al. |
| 2012/0079596 | A1 | 3/2012 | Thomas et al. |
| 2012/0143631 | A1 | 6/2012 | Ziade et al. |
| 2012/0150570 | A1 | 6/2012 | Samad-Khan et al. |
| 2013/0055399 | A1 | 2/2013 | Zaitsev |
| 2013/0205170 | A1 | 8/2013 | Bluvband et al. |
| 2013/0227697 | A1 | 8/2013 | Zandani |
| 2013/0232577 | A1 | 9/2013 | Watters et al. |
| 2013/0247205 | A1 | 9/2013 | Schrecker et al. |
| 2013/0305357 | A1 | 11/2013 | Ayyagari et al. |
| 2014/0137257 | A1 | 5/2014 | Martinez et al. |
| 2015/0106941 | A1* | 4/2015 | Muller ................ G06F 21/577 726/25 |

OTHER PUBLICATIONS

Bohme, Rainer, "Cyber-Insurance Revisited," Workshop on the Economics of Information Security, Kennedy School of Government, Cambridge, MA, 17 pages, 2005.

Bohme, Ranier et al., "Modeling Cyber-Insurance: Towards a Unifying Framework," Workshop on the Economics of Information Security, Harvard, 36 pages, Jun. 2010.

Dudorov, et al., "Probability Analysis of Cyber Attack Paths against Business and Commercial Enterprise Systems," In Intelligence and Security Informatics Conference (EISIC), 2013 European, pp. 38-44, IEEE, 2013.

Herath, Hemantha S. B. et al., "Copula-Based Actuarial Model for Pricing Cyber-Insurance Policies," Insurance Marketing and Companies: Analyses and Actuarial Computations, vol. 2, Issue 1, pp. 7-20, 2011.

Mckay, M. D. et al., "A Comparison of Three Methods for Selecting Values of Input Variables in the Analysis of Output From a Computer Code," Technometrics, vol. 42, No. 1, pp. 55-61, Feb. 2000.

Pearl, Judea, "Probabilistic Reasoning in Intelligent Systems: Networks of Plausible Inference," Revised Second Printing, pp. title, copyright, 37-38, 1988.

Sallhammar, Karin, Doctoral Thesis for "Stochastic Models for Combined Security and Dependability Evaluation," 66 pages, Jun. 2007.

Shetty, Nikhil et al., "Competitive Cyber-Insurance and Internet Security," Workshop on the Economics of Information Security, University College, London, 22 pages, Jun. 2009.

Shin, Seongju et al., "Advanced Probabilistic Approach for Network Intrusion Forecasting and Detection," Expert Systems with Applications, vol. 40, pp. 315-322, 2013.

Steinbach, Bernd et al., "An Extended Theory of Boolean Normal Forms," Proceedings of the 6th Annual Hawaii International Conference on Statistics, Mathematics, and Related Fields, Honolulu, HA, pp. 1124-1139, Jan. 2007.

Stuart, Alan et al., "Kendall's Advanced Theory of Statistics," vol. 1, pp. title, copyright, 151-155, 1994.

Vijayan, Jaikumar, "Major Companies, Like Target, Often Fail to Act on Malware Alerts," Computerworld, 4 pages, Mar. 14, 2014.

Yen, Jin Y., "Finding the K Shortest Loopless Paths in a Network," Management Science, vol. 17, No. 11, pp. 712-716, Jul. 1971.

Zhang, Harry, "Exploring Conditions for the Optimality of Naive Bayes," International Journal of Pattern Recognition and Artificial Intelligence, vol. 19, No. 2, pp. 183-198, 2005.

International Application No. PCT/US2015/037594, International Search Report & Written Opinion, 16 pages, Sep. 14, 2015.

Extended European Search Report for European Patent Application No. 15814876.7; dated Oct. 11, 2017; 9 pages.

\* cited by examiner

Embodiments of the Forecasting Model

| Embodiments 408 | Stage1 Input 402a | Stage1 Output 402b | State 2 Input 402c | Stage2 Output 404 | Iteration 406 |
|---|---|---|---|---|---|
| Self Insurance 408a | Current system | Current risk | New self-insurance strategy for evaluation | Risk for new strategy to compare with current risk | Stage 2: Optimize self-insurance Strategy |
| Security Evaluation and Hardening 408b | Current system | Current risk | New security/ Hardening measures | Change in risk from new measures | Stage 2: Optimize Security/ Hardening |
| Insurance and Bond Pricing 408c | Ensemble of systems | Ensemble of risks | NA | NA | Stage 1: Iteration over different systems and classes of systems |
| Portfolio Analysis 408d | Ensemble of systems | Ensemble of risks | NA | NA | Stage 1: Iteration over systems and classes of systems |
| Security Posture Optimization 408e | Secured system | Secured system risk | NA | NA | Stage 1: Optimize security posture |
| Risk Assessment 408f | Current system | Current risk | NA | NA | Stage 1: Update in time as new threats emerge and are detected |
| Attack Monitoring and Detection 408g | Current system | Current risk; monitoring design; possible attacker footprints | System with monitoring of possible attacker footprints | Monitored system risk; detection of possible attackers by comparison with attacker footprints | Stage 1: Optimize monitoring |
| Response and Recovery (2) 408h | Past system | System state at response | System state after response and recovery | Forecasted system state and risk profile after response and recovery | NA |
| Forensics 408i | Past system state, detected attacker footprints | System state after detected breach; est. breach pathways | Est. breach pathways | Predict possible undetected attacker footprints | Stage 1: Identify breach pathways from detected attacker footprints |
| ... 408n | Information 1 | Information 2 | Information 3 | Information 4 | Information 5 |

*FIG. 4*

Financial Loss Forecast Example Characteristics

111 — Types of Asset Data: IP, PII, PCMI, HIPAA, SOX, DOS, DDOS, Sensors

112 — Asset Categories: IP, PII, PCMI, HIPAA, SOX, DOS, DDOS, Sensors

113 — Asset Types: Tangible and Intangible

114 — Loss Aggregation: Bundles of distributed network assets, such as PII, HIPAA, IP 115 — Damage Types: Theft, Integrity, Availability, Confidentiality 116 — Loss Types: First Party and Third Party including Legal and Class Action Damages 117 — Damage Loss: Forecasted legal environment, precedents, likelihood of winning damages

*FIG. 16*

Embodiments of Use For the On-Site Network Data Feed Forecasting Model

| Embodiments | Stage1 Input | Stage1 Output | Stage2 Input | Stage2 Output | Iteration |
|---|---|---|---|---|---|
| Evolving Self Insurance | Current system and Network Feeds | Current risk | New self-insurance strategy for evaluation | Risk for new strategy to compare with current risk | Stage 2: Optimize self-insurance Strategy |
| Evolving Security Evaluation and Hardening | Current system and Network Feeds | Current risk | New security/Hardening measures | Change in risk from new measures | Stage 2: Optimize Security/Hardening |
| Evolving Security Posture Optimization | Secured system and Network Feeds | Secured system risk | NA | NA | Stage 1: Optimize security posture |
| Evolving Risk Assessment | Current system and Network Feeds | Current risk | NA | NA | Stage 1: Update in time as new threats emerge and are detected |
| Continuous Attack Monitoring, Detection and Alerting | Current system and Network Feeds | Current risk; alert and monitoring design; possible attacker footprints | System with monitoring of possible attacker footprints | Monitored system risk; detection of possible attackers by comparison with attacker footprints | Stage 1: Optimize monitoring |
| Likelihood of Need for Breach Incident Response Team | Current system and Network Feeds | Current breach risk, Loss Likelihood | New Breach risk state with and without response team | Breach system risk; loss and cost comparison with and with response | Stage 1: Likelihood of Network and System Breach |
| Response and Recovery (2) | Past system and Network Feeds | System state at response | System state after response and recovery | Forecasted system state and risk profile after response and recovery | NA |
| Directed Forensics Based on Feeds | Past system state, Network Feeds, detected attacker footprints | System state after detected breach; est. breach pathways | Est. breach pathways | Predict possible undetected attacker footprints | Stage 1: Identify breach pathways from detected attacker footprints |

*FIG. 22*

PROBABILISTIC MODEL FOR CYBER RISK FORECASTING

CROSS REFERENCE TO RELATED APPLICATIONS

This application is a continuation of U.S. patent application Ser. No. 14/319,994 filed on Jun. 30, 2014 entitled "Probabilistic Model for Cyber Risk Forecasting," which is hereby incorporated by reference for all purposes in its entirety.

TECHNICAL FIELD

The present disclosure relates generally to systems, apparatuses, and methods related to modeling risk as the probabilistic likelihood of loss, including financial loss, resulting from damage to a physical system, virtual system, data, and/or information assets in a computer network based on one or more cyber-attacks.

BACKGROUND

Damages resulting from cyber-attack campaigns, like the 2009 Aurora attacks against the networks of hundreds of companies, including Google and RSA, the 2010 Stuxnet attack designed to damage Supervisory Control and Data Acquisition (SCADA) facilities, and the 2011 Sony PlayStation attacks leading to the loss of millions of records of payment information, demonstrate the growing severity of the impact of cyber-attacks on network assets and industrial processes, as well as on economic and financial positions. The immediate sources of damage to assets may include, for example, data deletion, data corruption, data theft, release of protected data to the public, goodwill and reputational loss, system downtime loss, equipment loss, immediate revenue and subsequent financial loss, business continuity interruption, the internal costs detection, investigation of suspected breaches, containment of breaches, recovery of systems, and ex post facto responses including costs of legal ramifications such as class action lawsuits or other litigation, among others. Subsequent damages can range from loss of intellectual property (IP) by data theft to downtime of SCADA systems or other control systems, which may lead to losses of product manufacturing, delivery of critical services, and casualties, including human injury or loss of life. Damage to and/or the compromising of logical controllers and/or data systems (e.g., on vehicles, energy infrastructure, pipelines, and nuclear reactors) can, among other things, disable safety alerts and cause equipment to operate outside of its standard operating range resulting in damage to property and persons.

An organization's assets residing on computer networks have become more difficult to protect as assets and networks have grown in size and complexity. Businesses, governments, and other organizations have expanded computer network access internally across a growing number of fixed and mobile computers and devices authorized for employee access, as well as access externally to public and private cloud environments, and trusted customers/clients, vendors and suppliers. The growth of these access points greatly increases the exposure of organizational assets to potential compromise and loss.

At the same time, network security teams are confronted by a number of challenges, including the large number of channels into an organization (Wi-Fi, USB flash drives, mobile devices, VoIP and the like), the size and diversity of the infrastructure requiring protection, the number and diversity of applications (including plug-ins), and the overwhelming amount of network traffic to monitor and scan—each evolving, sometimes dramatically, in complexity over time. Control systems, such as SCADA systems, that drive manufacturing, critical energy, transportation, and other operational systems, which once used to be isolated and analog in nature, are now migrating to digital systems and are progressively connected via the Internet for on-line licensing, performance tracking, patching and software updating. As a result, the exposure to attack through network pathways continues to increase.

Adding to the complexity, cyber tools that target assets have become more sophisticated, attackers' tactics and techniques more advanced, and the availability of sophisticated commodity malware in illicit markets more accessible to a global set of attackers. The networks they target extend across different devices and site locations globally, and competing security products in the marketplace in many cases have not kept pace with existing and emerging malware threats, and in many cases have opened additional vulnerabilities for attackers by their very operation. There is an expanding array of attacker entry points and capabilities that range from placing insiders intentionally in organizations for physical access, to targeting the supply chain of software and hardware, to false website mirroring, to social engineering against employees in an organization, to mapping out an organization's network and connected assets via external reconnaissance techniques, to other new and evolving methods. Using this increasing range of entry points to access systems, attackers can eventually enter and propagate across a target organization's network subnets at different security levels, obtain local and domain access to systems, and maneuver to gain access through privilege escalation, and then take on the identify of valid users and administrators inside the organization so as to access and damage targeted assets throughout the network.

Furthermore, many security products today suffer from large false alarm rates and ultimately do not forecast where attackers are headed in their attack sequence. During the Target attacks in December 2013 that led to the theft of 40 million credit and debit cards and personal data on another 70 million customers, it was reported (e.g., in Computer World, Mar. 14, 2014) that many alerts were generated from various security layers and products; however, the individual false alarm rate was high enough on security products that the alarms were essentially ignored. In addition, critical security control mechanisms were not properly utilized that could have denied attackers access along likely pathways in a timely manner so as to prevent the attacker's further progression within the system. Finally, intrusion detection systems (IDS) that do integrate security alert data and traffic from different products in order to improve situational awareness typically do not integrate stochastic asset loss forecasting into their methods and therefore cannot include uncertainties when correlating attacker pathways into their alerting calculations so as to further reduce false alarm rates.

BRIEF DESCRIPTION OF THE DRAWINGS

FIG. 4 depicts a chart of embodiments of the described technology as they relate to sequenced staging of a forecasting model.

FIG. 16 is a block diagram of an embodiment of the described technology depicting a list examples of financial loss forecast characteristics involved in a damage probability estimation that can be computed according to an embodiment of the described technology.

FIG. 22 depicts a chart related to on-site security live or periodic data-feed driven solutions as part of an organization's security posture to mitigate loss.

DETAILED DESCRIPTION

Figure 1:
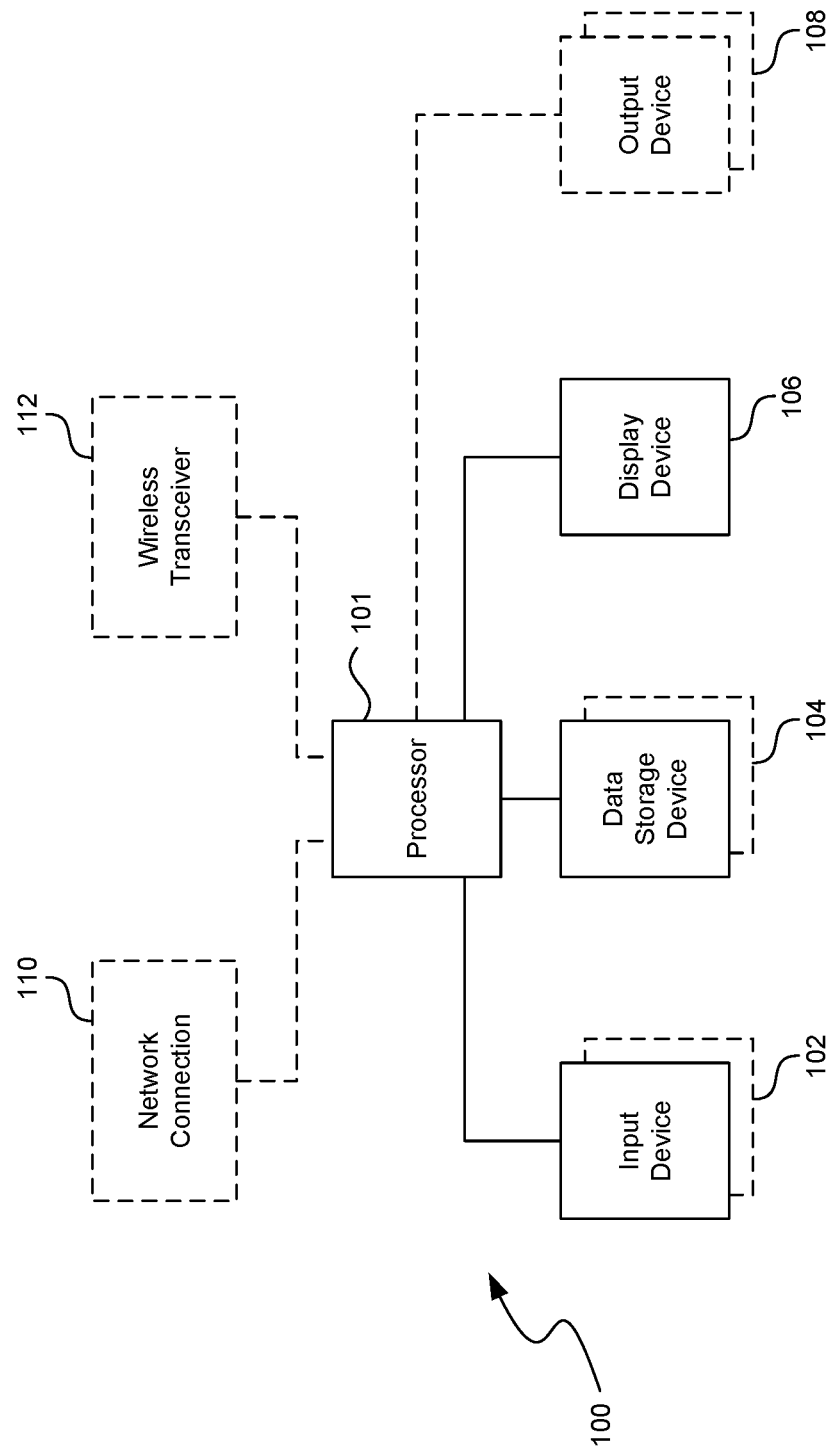
FIG. 1 is a block diagram of a basic and suitable computer that may employ aspects of the described technology.
Figure 2:
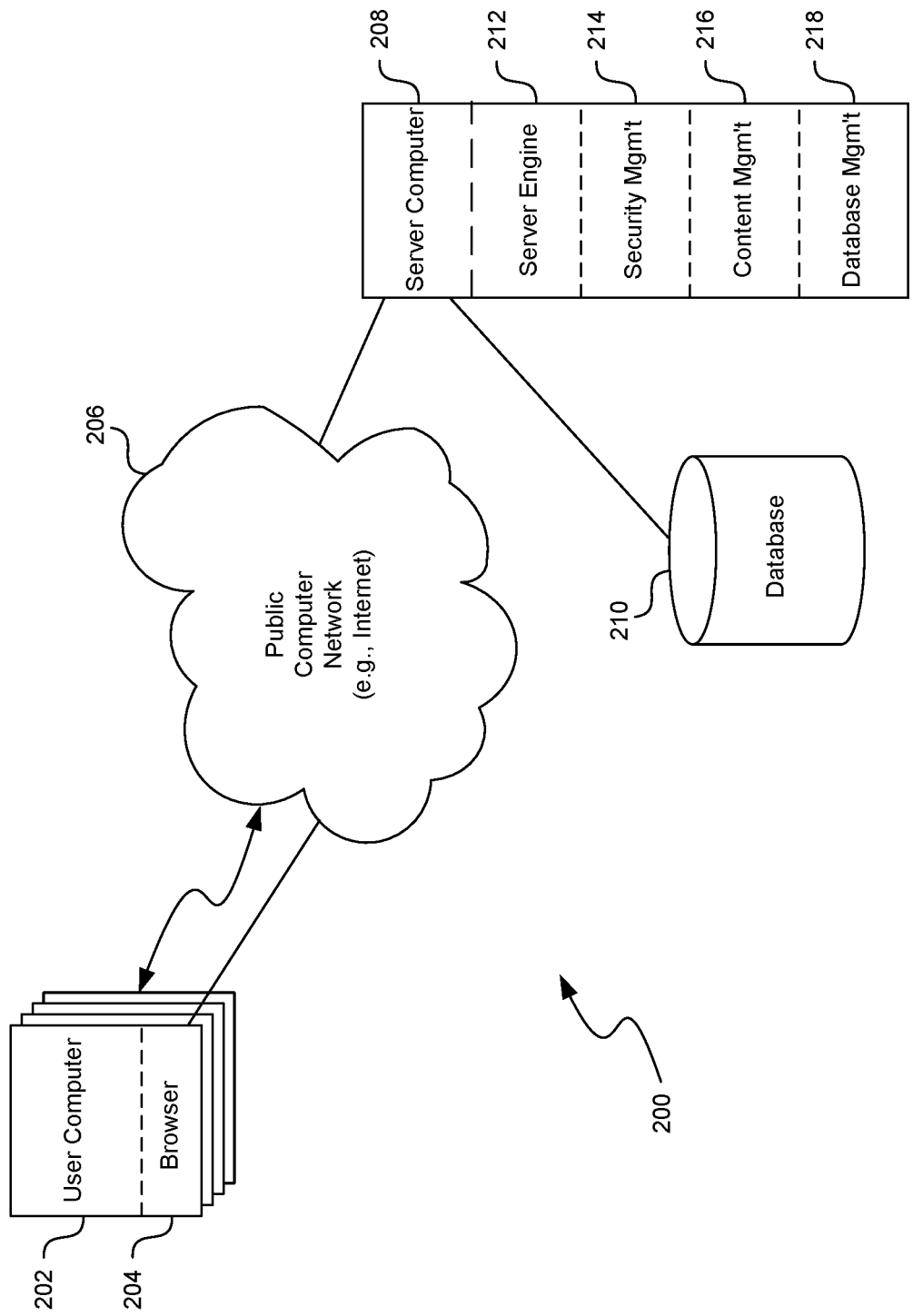
FIG. 2 is a block diagram illustrating a simple, yet suitable system in which aspects of the described technology may operate in a networked computer environment.

Introduced below are methods, devices, and systems (collectively herein referred to as "technology") related to modeling risk as the probabilistic likelihood of financial loss resulting from damage to a physical system, virtual system, data, and/or information assets in a computer network based on one or more cyber-attacks. The described technology generally relates to risk modeling and computer networks, and, more specifically, to modeling risk in order to forecast damages to an organization's assets and the related financial loss resulting from man-made cyber-attacks, or accidents and system failures. The described technology, in one or more embodiments, allows for pricing and portfolio analysis for insuring organizations against cyber-attack, improving detection and containment of cyber-attacks, and cost-benefit tradeoffs for mitigating cyber risk in complex, multi-node computer network environments operating across different industry segments.

Definition of Terms

"Response", in various embodiments, refers to "breach response" that are one or more actions taken by an organization, either internally or through third-party vendors, to confirm a potential breach, determine the extent of the breach, contain the breach and prevent further damage, restore operations, and provide forensic analysis.

"Recovery", in various embodiments, refers to "breach recovery" which includes recovery protocols to limit damage and resume normal operations after a breach incident, including return of systems to original pre-attack state, replacement of damaged equipment, notification and protection of customers, and estimating first and third party losses from the breach.

"Target network", in various embodiments, is a network of elements, including, but not limited to, routers, switches, servers, devices, displays, computers, services, activities, and interconnects.

"Cyber incident", in various embodiments, is an incident related to a compromise of a computer network, including one that leads to a loss of one or more assets (e.g., a valued asset, as described below), or which the originator of the incident intends to effect a loss.

"Threat agent", in various embodiments, is a specific attacker with actors or a threat group category with category properties whose likelihood of attack varies on factors including, but not limited to, geography, industry segment, political preferences, government affiliation, and relation to financial events or activist causes. The threat agent can be used to normalize the likelihood of attack on the targeted organization based on its industry segment, location and relation to world or local events.

"Insured", in various embodiments, is an individual or organization that is paying to insure itself against loss of valued assets either via third-party insurance contracts or by self-insured approaches to improve security control measures.

"Advanced persistent threat" (APT), in various embodiments, is a network attack in which an unauthorized person gains access to a network and stays there undetected for a long period of time. The attack is typically executed by an organized entity such as a foreign government. An APT usually targets specific assets of interest to the attacker and may target future assets over an extended period of time. This threat can be designed for theft, intelligence-gathering purposes or to damage/disable the target network. The APT is persistent in its attempts to access or attack its intended target.

"Zero-day", in various embodiments, refers to an attack or threat that exploits a previously unknown vulnerability in a computer system, meaning that the attack occurs on "day zero" of awareness of the vulnerability, suggesting there is no patch for the vulnerability.

"Tangible assets", in various embodiments, are physical items and their subsystems that can be affected by a cyber-attack. Tangible assets may include but not limited to computers (laptops, servers, storage devices, mobile devices), networks (communication pathways, connectivity), services (services a company provides via computers), property (real estate, physical or intellectual property), business revenue (web services, sales), and people (employees, third-party contractors, executives, general public), vehicles, equipment, and/or any physical subsystem.

"Intangible assets", in various embodiments, include assets of an organization that are proven to exist through a document or a database, can be identified as an asset, can be legally protected, can be quantified in terms of asset value, have a lifespan, can be owned by one or more entities, and exist in one or more places in the marketplace. Examples of intangible assets include, but are not limited to, marketing assets (trademarks, trade names, brand names, logotypes), technology assets (patents, patent applications), artistic assets, data processing assets (software and software copyrights), engineering assets, customer-related assets (including relationship, contracts and lists), human capital assets, location-related assets (easements and mineral- or oil-exploitation rights, water and air rights), online-related assets (domain names, web site design).

"Information asset", in various embodiments, is information residing on a networked system that has value to an organization and whose value would be diminished by affecting its integrity, confidentiality, and availability. Examples include an information asset being corrupted, deleted, or made known outside the organization.

"Valued asset", in various embodiments, is a tangible, intangible, physical, and/or information asset that results in value loss if integrity, availability, and/or confidentiality are affected, and includes but is not limited to servers, computers, mobile devices, storage devices, services including cloud services, security products, devices, software, web sites, serial port devices and information of the following types: personally identifiable, payment, investment, corporate performance, financial, contract, mergers and acquisition, medical, legal, marketing, human resources, human safety and life, and sensor information.

"Networked system", in various embodiments, is a system including one or more networks, desktops, mobile devices, servers, security devices, routers, switches, or firewalls. It also includes the software that is installed on the constituents of the system that have one or more processors, including software installed by a user, a system administrator, manufacturer, security expert, or tester. An example is the computer network of a corporate or government entity.

"Security posture", in various embodiments, is comprised of the security control measures intended to mitigate or reduce damages that may result from cyber-attacks. This includes security products and devices, organizational processes and policies, software updating and patching, and network configuration.

"System state", in various embodiments, is the individual state of any of the constituents of the networked system and the distributed state of the system. In particular, states represent the types and degree of compromise brought about through the action of malware attacks in altering access to various assets on the networked system, for example, by altering privilege levels or by circumventing security controls.

"Change in system state", in various embodiments, is a change in the state of any of the individual constituents of the networked system and a change in the distributed state of the network.

"Attacker", in various embodiments, is a human or software agent whose purpose is to perform some willful action that is detrimental to site users or owners by causing or attempting to cause losses. Such losses can include but are not limited to unauthorized access, time, money, reputation, trust, privacy, intellectual property, physical damage, and loss of human life.

"Attacker goal", in various embodiments, is the main result desired by the attacker. This includes theft of data, willful corruption of data, and deletion of data. It may include denial-of-service attacks which interfere with the use of computer resources by customers and internal personnel. It may also include damage to physical systems by imposition of the faulty operation of computer control devices, such as in a SCADA system.

"Attack", in various embodiments, is the sequence of actions performed by an attacker and the changes in the attacker state during the sequence of actions.

"Attack scenario", in various embodiments, is (1) the sequence of actions performed by an attacker, (2) changes in the attacker state during the sequence of actions, (3) actions performed by the system state in response to the attacker's actions, (4) changes in system state in response to these actions, or (5) changes in system state performed by an attacker.

"Attacker state", in various embodiments, consists of the concatenation of (possibly time-varying) characteristics of an attacker. Examples are user login privilege, admin login privilege, and the device location where the attacker currently resides at a given point in time.

"Attacker attributes", in various embodiments, are characteristics of the attacker that are independent of a particular networked system. These include characteristics that do not vary in time or vary slowly over the time span of interest, and characteristics that may vary in time. An example is the skill level of the attacker in executing system exploits. Over a relatively short time frame, the skill level may effectively be considered a constant in time. In other cases, the attacker may incur a sudden increase in skill level due to recruitment of new skilled personnel. Alternatively, an attacker might acquire malware from an illicit market vendor, which is significantly more sophisticated than malware that attacker may have used before or than he is capable of developing, thus incurring a sudden increase in skill level. Another attacker attribute is the amount of time available to the attacker in reaching his goal. A potentially important attacker attribute is the attacker goal type, or category. For example, one type of attacker may have the goal of stealing a particular type of information, whereas another type of attacker may have the goal of performing denial-of-service attacks on certain sets of organizations in order to cause financial and reputation damage to a particular industry.

"Vulnerability", in various embodiments, is software, hardware, and/or a physical condition which allows the possible usage of a function or set of functions of a software or hardware component or system of components by an attacker or unauthorized user that is only intended to be executed by a particular class of approved users. Intended usage is often enforced by authentication and physical access mechanisms.

"Exploit", in various embodiments, is an implementation that takes advantage of a vulnerability to perform possible usage of a function or functions of a software or hardware component or system of components by a user or attacker that is only intended to be executed by a particular class of approved users, or is executed outside the intended usage of the component or system.

"User", in various embodiments, refers to an intended, properly-authorized operator of a user device, such as a desktop or mobile device.

"Ancestor node", in various embodiments, of a given node A in a directed graph is any node that can reach node A by following a path of directed links.

"Disjunction" of logical conditions or mathematical logic statements is their logical 'or.'

"Conjunction" of logical conditions or mathematical logic statements is their logical 'and.'

"Elementary logic statement", in various embodiments, is a mathematical logic statement that is not the conjunction or disjunction of logic statements.

"Basis logical condition", in various embodiments, is a logical condition that is either an elementary logic statement or belongs to some prior set of logical conditions specified by the user. Typically, probabilities and time distributions for basis logical conditions are given by the user or are read from a computer storage medium.

"Exceedance probability curve" (known also as an "EP curve"), in various embodiments, specifies the probabilities that various levels of loss will be exceeded over a certain period of time. The losses can be measured in terms of dollars of damages, fatalities, illness, or some other unit of analysis.

"Site" refers to, in various embodiments, an organization's intangible and tangible assets; primary, secondary, and other networks; and/or other objects that are part of the risk and related forecast calculations. The term "site" does not restrict the definition to a single geographical location, but also includes other locations that are connected by network communication.

"Security control measures", in various embodiments, refers to the aggregate of security policies, procedures, processes, technologies, practices and training undertaken by an organization to secure that organization's computer network(s).

Description of the Technology

In one or more embodiments, the described technology provides an accurate quantification of risk, financial loss and assessment of network security control measures to minimize damage given the rate and type of attack by, for example, quantifying the likelihood of damage and loss due to the range of cyber threat vectors, both attack-based and accidental, that can bypass current security mechanisms and damage assets. Calculating the likelihood of damage to assets as a function of time over forecasted time intervals and knowing the cost to an organization of deploying traditional security appliances is useful to assess cost-benefit decisions around security product architecture and adoption. This quantification estimates loss for the duration of contract periods and helps guide pricing and portfolio analysis of exposures for insurance, re-insurance, bonds, and self-insurance applications. In some embodiments, it can also identify best-practice security mitigation approaches and configurations specific to the company running the analysis.

Embodiments of the described technology are related to modeling risk as the probabilistic likelihood of loss resulting from damage to physical systems, virtual systems, data, and information assets in a computer network. This loss originates from cyber threats that include automated and man-made attacks, or accidents and failure involving physical systems or people. The described technology in various embodiments accurately quantifies linear and non-linear damages to network-dependent assets by propagating probabilistic distributions of attack and accidental events in sequence and time in order to forecast damages over specified periods. This damage-forecast method can be used to forecast financial losses from cyber-attacks over time windows looking forward from past, present, and future times. When dealing with intentional attacks by groups, the risk model includes the essential components of the threat group's goals and techniques, the targeted physical and virtual networks, the mitigating security control measures, vulnerabilities of the site, and the targeted tangible and intangible assets.

Attacker characteristics and attack rates are computed by the described technology according to targeted organization characteristics and the resource limitations of the attacker, including the time available to execute its goals. The types of attacks considered, in some embodiments, include logical and physical access to a computer network that directly or indirectly lead to losses to an organization and associated third parties resulting from the compromise of integrity, confidentiality, or availability of physical and information assets.

The resulting risk forecast has the necessary statistical dependencies on targeted organization characteristics, such as its security policies, employee training, network configuration, devices, software, and assets under risk. Such characteristics also include the degree of interdependence between organizations that can lead to catastrophic risk, including cases where one organization's damage correlates to another organization's damage due to common vulnerabilities, failure of common security control measures, trust relationships exploited among large numbers of organizations, and large multi-stakeholder and personal data exposure that can lead to large class-action lawsuits against an organization such as those filed against a cloud data center provider.

These capabilities enable various embodiments such as pricing the average cyber loss to an organization's exposed assets over fixed and varying periods of time; estimating the losses across diversified financial portfolios that hold large numbers of organizations from both common and disparate industry segments, geographic locations, and levels of exposure; and/or analyzing the cost-effectiveness of deploying particular security configurations in anticipation of forecasted threats and implementation costs. With such embodiments, the described technology can identify correlations of losses resulting from common threats, security control measures, vulnerabilities and other characteristics across multiple sites, in turn allowing modeling of systemic risk across diversified portfolios.

The described technology, in various embodiments, tracks probabilistic time in order to incorporate temporal variations in attacker behaviors and an organization's system, response, and recovery behaviors that are associated with complex cyber-attack campaigns. The probability distribution of damage event occurrence and reoccurrence along attack pathways is propagated in time through the targeted organization's network, through other interdependent third-party organizations, or through the use of capabilities acquired by attacking other organizations whose security profiles are linked to the target organization (e.g., by stolen passwords, authentication credentials, etc.). The distribution of attack pathways can represent behaviors varying over time associated with attack types, including those that take place outside of the main network, such as botnets, DNS redirection, backbone router attacks, site mirroring, and watering holes.

The time at which an event within a pathway occurs (event being what an attacker initiates and the result of the attacker's and defender's actions) is uncertain and therefore is represented in the described technology as a probability distribution. In one or more embodiments, the sequence of cascading events is estimated by the described technology by propagating event-time probability distributions through the systems related to the site.

The event-time distributions themselves change in time due to time dependent variables, which include attacker attributes, vulnerabilities, exploits, system vulnerabilities and components, security control measures, and/or other variables. The resulting change of event time distributions, in some embodiments, is performed by the described technology in order to forecast the dependence of loss on the time-dependent variables. Therefore, event-time distributions can be propagated in both time and location.

The resulting event-time distributions of the loss events are used, in various embodiments, to calculate the time distributions of the damage within the forecast time window. This distribution can be used to: provide the view of the current risk extending over different time periods (e.g., as with one-year and five-year insurance contracts) according to the range of predicted future outcomes of price contracts including, but not limited to, insurance, reinsurance, and/or capital-market bonds; assess risk for "claims-made" insurance contracts that are defined to cover events happening even before the contract period, and "occurrence" contracts that cover events originating only within the contract period; assess the pathways leading to the most severe loss of assets over the said time period; manage financial risk across portfolios of insured networks that includes correlated effects (e.g., counterfeit certificates, risk resulting from a new zero-day threat that impacts multiple companies); provide cost-benefit analysis of security implementation and maintenance life cycle to achieve desired reductions in levels of asset loss over time; and/or specify cost and time of response and recovery.

Input information necessary to execute the described technology can be read from storage media or accepted through user input devices. The output information produced by the described technology can be output to storage media or displayed on user output devices. The described technology is able to accept and provide the information in order that either or both user input and output devices can be either graphical or text based or both. Either of the input or output devices can be part of the same computer in which the described technology is implemented, or they can be on another computer connected to the computer implementing the described technology by a common network. The input and output devices can be implemented as a single system product.

The described technology can be installed and operated as a stand-alone system or as software as a service. For example, in one or more embodiments, a server-based system accepts direct security information feeds from other third-party and in-house security services operating in the network. In various embodiments, the described technology can be implemented as a public and/or private cloud-based software system that can accept feeds from a network. In some embodiments, the described technology can be implemented as a jointly operated combination of appliance and cloud-based architectures integrating feeds on site and allowing system control via the cloud services.

The described technology, in various embodiments, inputs continuous on-site information and data feeds to provide periodically updated risk output where the cyber-attack pathways are probabilistically updated to forecast the likelihood of attacker states in the network. This approach integrates positive alerts and information, including both positive false and true detections and negative information, to update attack pathway probabilities. The described technology can input quantitative information feeds such as network topology, security alerts, activity rates, raw traffic, web browsing, content transfer, user/security personnel input, incident response data and other feeds that impact the likelihood of pathways in the network and its systems to forecast the likelihood of attacker states in the network. The described technology allows broad correlation and integration of security and attack-related data that can provide a method for detection of network compromise, lower false alarm rates on the detection, improve response time and effectiveness for security teams.

Potential end-use applications of the described technology, in various embodiments, include cyber insurance and reinsurance pricing, corporate credit evaluation, cyber security, network security assessment, network hardening, system security design, security appliance evaluation, cyber threat detection, threat neutralization, network monitoring, and/or training for network administrators and network security teams.

Use of the described technology is not limited to financial-risk assessment. One or more embodiments can be used, for example, for inputting real-time network data and providing updated risk assessments to forecast the probability of asset loss and the most likely contributing attack paths for different forecast time periods (e.g., one day, one week, or one year). This allows organizations to build a risk mitigation strategy and manage both immediate and longer-term risks in a self-consistent and systematic manner. A network administrator may be responsible for monitoring likely attack pathways, improving placement of security products and sensors, and deploying active deception approaches to trap attackers so as to maximize the likelihood of detection and reduce risk on a continuous basis, such as in the case of using a honeypot as a control measure. Identifying the most likely pathway scenarios that will lead to damage of assets provides key information for both prioritizing defenses for a network administrator and for training security staff by walking through the methods of the attack that lead to asset loss. Modeling pathways to loss of critical assets both pre- and post-implementation can also contribute to optimizing deployment, re-configuration and corrective-maintenance activities on a regular basis.

To provide improved ability to detect an attacker and their activity pathway in the network, the forecasting technique has one or more embodiments for inputting on-site network system alerts, traffic data, network topology, user and investigative security team input and other information. The forecasting technique is used by the described technology to reduce response time by providing lower false alarm rates and improving the location and helping to identify an attacker's goals and behaviors to minimize losses within an organization once it is compromised. The described technology can help identify the point in time that is best to trigger the issuance of a summons to an external breach-response team on the basis of the risk-of-loss estimate and the tradeoff with cost-benefit forecasts, and to recommend other security decisions that can focus and dynamically allocate response and security control measures to mitigate the likely activities of the attackers. As an example, the described technology can generate and/or update whitelisting rules on a specific system in the network in order to detect a rare but sophisticated attacker (and their specific rootkit tactic and protocol set) where incoming alerts over the last two weeks leads to an increased forecast of the likelihood of significant asset loss for the organization.

In various embodiments, the described technology incorporates a unified framework that provides the temporal behavior in various respects. First, scenarios for existing and future cyber-related behaviors are modeled as a hierarchy that aggregates detail at different levels. This allows subsystems to be specified at higher levels of aggregation when details are not known, and allows for the progressive incorporation of higher level detailed knowledge (e.g. about attacking group attributes and behaviors, and security response behaviors and attributes), to allow improved resolution of modeling as more information is gained on attackers, vulnerabilities, security controls, and other pertinent details. This has the added advantage of allowing for calibration of the model with different levels of aggregate data. It also allows the risk of loss to be calculated from different levels of aggregate information for describing a target organization's system architecture, security control measures and assets. Second, multiple event-occurrence time probabilities are modeled and propagated along pathways so as to capture the time-dependent interaction of multiple threats, systems, security, damages, and asset-loss behaviors. Third, the approach rigorously propagates the full range of multi-path attacks to assets and other triggered event sequences in order to estimate damage forecasts and probability of detection.

The described technology described herein calculates the likelihood of financial loss resulting from network attack as a distribution in time. Therefore, this calculation can be used statistically to estimate pricing for insurance products. The described technology can incorporate live and/or historical data from different information systems in order to provide data-driven forecasts of likelihood of attack, loss of assets, and/or financial loss on computer networks on a periodic or continuous basis.

This described technology generally uses a different approach to cyber-risk modeling than existing scenario-based and rank-order technologies by providing likelihoods of different loss amounts over periods of time looking forward (e.g., one output is an exceedance probability curve that gives the likelihood of experiencing a certain loss in a given period of time, such as 80% probability of losing $10M in payment assets over the next one year).

The described technology moves beyond scenario-based vulnerability and configuration analysis. In one or more embodiments, it can forecast the probabilistic likelihood of success of an attack leading to loss of assets. This is because in various embodiments the described technology can generate a representative distribution of attacks targeting an industry segment, decomposed into malware and exploit types and ultimate attacker goals; calculate the likelihood that certain assets will be targeted in the network; and/or (calculate the likelihood of attack pathways between network elements at the edge of the network and with networks and servers containing the targeted assets, for example. The behaviors of attack include, e.g., access attack vectors such as obtaining credentials via various mechanisms in order to access both virtual and physical systems. As an example, an attacker may quickly harvest and take on user or administrative privileges, thus becoming for all intents and purposes an insider threat to the organization. He may then move without detection from system to system even when no vulnerabilities are present.

The described technology calculates damage and financial loss, including both direct and indirect first- and third-party losses, resulting from damage to the integrity, availability, and confidentiality of information, services, equipment, and property. Additionally, this loss calculation includes both injury and loss of life directly resulting from the attack. The described technology specifically assesses probabilistic asset damage for assets that may be distributed across different logical and physical networks and physical locations in an organization. It also provides probabilistic damage and financial loss distributions from cyber-attacks.

The described technology simulates and forecasts attacks, intrusions and infections, and the ability of security products to limit propagation through the network. The described technology creates the ability to look at both current and future trends in security product efficiency, network vulnerabilities, attacker goals and techniques, their temporal campaigns and specific attack likelihoods, along with uncertainties in these variables to give a high-fidelity risk estimate. The effect of attacker behavior on the time needed to traverse particular attack pathways is particularly useful for modeling APTs.

Embodiments of the described technology can use a combination of Monte Carlo techniques and propagation of analytic distributions in order to create a model of the likelihood of loss in a computer network. These simulations serve to represent uncertainties in characteristics, calibrations, and information throughout various stages of an attack lifecycle. They work on the principle that security control mechanisms, humans, software, and other system elements, and their expected and unexpected behaviors in different portions of the network, may be exploited with a certain probability and with a temporal likelihood. Furthermore, certain security control measures and reconfigurations can be purposefully introduced into the network infrastructure to allow a network security team to detect, mitigate and respond to likely exploitation, damage and exfiltration pathways over the periods of time forecasted.

One or more embodiments of the described technology estimate threat characteristics and attack rates based on the characteristics of the targeted organization, and resource limitations on an attacker, including time available to execute attack goals. Alternatively, the user may specify threat and attack rates through input or by reading from a data file.

The described technology forecasts probabilities of potential attacker behaviors and pathways based on the attributes and characteristics of the attacker and, in various embodiments, propagates distributions of the effectiveness of security products and processes in slowing attacker progression, detecting attackers, and terminating their actions in time.

The described technology, in various embodiments, can forecast the likelihood of behaviors of an attacker attempting to execute one or more sub-goals before reaching the main goal leading to asset loss, thus extending the scope of the model beyond pure penetration testing approaches. In one or more embodiments, attacker sub-goals for example may include obtaining device and network information; searching for assets; lying dormant until an asset is placed on a computer; and/or traversing to a computer with an asset.

Cyber risk inherently conveys a sense of uncertainty related to incomplete knowledge from, for example, the specifics of the threat, the value and vulnerability of network assets, and the range of damages that could result from a cyber-attack. The described technology incorporates these unknowns and uncertainties as probability distributions in the model which are propagated to understand and quantify damages and loss.

The described technology provides a process for hierarchically representing network topology, security products, security policies and processes for the purposes of modeling risk consistently both at aggregate levels across the network and at more detailed levels of the network.

In some embodiments, the described technology provides a probabilistic propagation of attack pathways across networks, subnets, devices, security products, and services (including the interaction with security policies and processes), network response of security products, and incident response and remediation performed by security teams. The described technology, in one or more embodiments, provides multiple likely attack pathways that include events due to both the attacker actions and system state changes in response to attack.

In some embodiments, the described technology provides a probability distribution of event occurrence times propagated along attack pathways in order to give a distribution of occurrence times at each event within the system due to attack and response actions. The events analyzed include, in one or more embodiments, those involved both in the attack and in the recovery phase.

The probability distributions are calibrated from historical, and current information, including expert elicitation.

In one or more embodiments, the described technology provides a probabilistic propagation of threat agents and their campaigns into different industry segments in order to characterize the likelihood of an organization and particular assets being targeted, as well as the exploits used in attack pathways, including but not limited to perimeter, social-engineering, insider, counterfeit certificates and physically coordinated attacks and other emerging attack sets.

In various embodiments, the described technology provides a probabilistic damage determination for different information assets in the network over time based on the likelihood of particular exploits being used by the attacker, and resulting propagation in networks to determine specific and aggregated losses over time to assets that can be distributed across the network.

In some embodiments, the described technology provides an exceedance probability curve for total expected loss to assets and an exceedance probability curve that may be propagated through financial instruments in order to provide pricing for insurance, reinsurance, and bonds for underwriting or covering cyber loss under specific contract conditions (e.g., deductibles and limits).

In one or more embodiments, the described technology provides analytical capability that allows for querying for the specific set of occurrences of events in the forecast distribution that are of interest to insurers, reinsurers and/or the target organization. This may include, for instance, querying the most damaging events to help mitigate these damages and/or querying only those events that damage a specific set of assets.

In various embodiments, the described technology optimizes security products' configurations for asset protection by, for example, providing a probabilistic estimate of the largest reduction in risk for the least cost for the targeted organization.

In some embodiments, the described technology provides security product monitoring and response that includes the calculation of a probabilistic pathway state estimate to alert on the most likely attacker penetration paths based on the range of observables collected in the network and hosts.

Detailed Description of Processes

The following description provides specific details for a thorough understanding and enabling description of these embodiments. One skilled in the art will understand, however, that the described technology may be practiced without many of these details. Additionally, some well-known structures or functions may not be shown or described in detail, so as to avoid unnecessarily obscuring the relevant description of the various embodiments.

Certain details are set forth in the following description and in FIGS. 1-23 to provide a thorough understanding of various embodiments of the disclosure. Other well-known structures and systems often associated with electronic financial analysis and network security systems have not been shown or described in detail below to avoid unnecessarily obscuring the descriptions of the various embodiments of the disclosure. Additionally, a person of ordinary skill in the relevant art will understand that the disclosure may have additional embodiments that may be practiced without several of the details described below. In other instances, those of ordinary skill in the relevant art will appreciate that the methods and systems described can include additional details without departing from the spirit or scope of the disclosed embodiments.

Many of the details, dimensions, functions and other features shown and described in conjunction with the Figures are merely illustrative of particular embodiments of the disclosure. Accordingly, other embodiments can have other details, dimensions, functions and features without departing from the spirit or scope of the present disclosure. In addition, those of ordinary skill in the art will appreciate that further embodiments of the disclosure can be practiced without several of the details described below.

The terminology used in the description presented below is intended to be interpreted in its broadest reasonable manner, even though it is being used in conjunction with a detailed description of certain specific embodiments of the described technology. Certain terms may even be emphasized below; however, any terminology intended to be interpreted in any restricted manner will be overtly and specifically defined as such in this Detailed Description section.

The techniques introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIG. 1 and the following discussion provide a brief, general description of a suitable computing environment in which aspects of the described technology can be implemented. Although not required, aspects of the described technology may be described herein in the general context of computer-executable instructions, such as routines executed by a general- or special-purpose data processing device (e.g., a server or client computer). Aspects of the described technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the described technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (packet switched, circuit switched, or other scheme).

The described technology can also be practiced in distributed computing environments where tasks or modules are performed by remote processing devices, which are linked through a communications network, such as a Local Area Network (LAN), Wide Area Network (WAN), or the Internet. In a distributed computing environment, program modules or subroutines may be located in both local and remote memory storage devices. Those skilled in the relevant art will recognize that portions of the described technology may reside on a server computer, while corresponding portions reside on a client computer (e.g., PC, mobile computer, tablet, or smart phone). Data structures and transmission of data particular to aspects of the described technology are also encompassed within the scope of the described technology.

Portions of the described technology can be practiced on and/or distributed between one or more network appliances. A network appliance is a stand-alone device connected to a network and can be configured to communicate with another network appliance, server, and/or other computing device.

Referring to FIG. 1, the described technology employs a computer 100, such as a personal computer or workstation, having one or more processors 101 coupled to one or more user input devices 102 and data storage devices 104. The computer 100 is also coupled to at least one output device such as a display device 106 and one or more optional additional output devices 108 (e.g., printer, plotter, speakers, tactile or olfactory output devices, etc.). The computer 100 may be coupled to external computers, such as via an optional network connection 110, a wireless transceiver 112, or both.

The input devices 102 may include a keyboard, a pointing device such as a mouse, and described technology for receiving human voice, touch, and/or sight (e.g., a microphone, a touch screen, and/or smart glasses). Other input devices are possible such as a joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet (not shown in FIG. 1).

Aspects of the described technology may be practiced in a variety of other computing environments. For example, referring to FIG. 2, a distributed computing environment with a network interface includes one or more user computers 202 (e.g., mobile devices) in a system 200, each of which includes a graphical user interface (GUI) program component (e.g., a thin client component) 204 that permits the computer to access and exchange data, such as network and/or security data, with a network 206 such as a LAN or the Internet, including web sites, ftp sites, live feeds, and data repositories within a portion of the network 206. The user computers 202 may be substantially similar to the computer described above with respect to FIG. 1. The user computers 202 may be personal computers (PCs) or mobile devices, such as laptops, mobile phones, or tablets. The user computers 202 may connect to the network 206 wirelessly or through the use of a wired connection. Wireless connectivity may include any forms of wireless technology, such as a radio access technology used in wireless LANs or mobile standards such as 2G/3G/4G/LTE. The user computers 202 may include other program components, such as a filter component, an operating system, one or more application programs (e.g., security applications, word processing applications, spreadsheet applications, or Internet-enabled applications), and the like. The user computers 202 may be general-purpose devices that can be programmed to run various types of applications, or they may be single-purpose devices optimized or limited to a particular function or class of functions. More importantly, any application program for providing a graphical user interface to users may be employed, as described in detail below. For example, a mobile application or "app" has been contemplated, such as one used in Apple's® iPhone® or iPad® products, Microsoft® products, Nokia® products, or Android®-based products.

At least one server computer 208, coupled to the network 206, performs some or all of the functions for receiving, routing, and storing of electronic messages, such as security data, web pages, audio signals, electronic images, and/or other data. While the Internet is shown, a private network, such as an intranet, may be preferred in some applications. The network may have a client-server architecture, in which a computer is dedicated to serving other client computers, or it may have other architectures, such as a peer-to-peer, in which one or more computers serve simultaneously as servers and clients. A database or databases 210, coupled to the server computer(s), store some content (e.g., security-related data) exchanged between the user computers; however, content may be stored in a flat or semi-structured file that is local to or remote of the server computer 208. The server computer(s), including the database(s), may employ security measures to inhibit malicious attacks on the system and to preserve the integrity of the messages and data stored therein (e.g., firewall systems, secure socket layers (SSL), password protection schemes, encryption, and the like).

The server computer 208 may include a server engine 212, a security management component 214, a content management component 216, and a database management component 218. The server engine 212 performs basic processing and operating system level tasks. The security management component(s) 214 handle creation, streaming, processing and/or routing of networking and/or security data. Security management components 214, in various embodiments, includes other components and/or technology, such as a forecasting input build component, damage forecast component, financial loss forecast component, run forecast component and/or other components and/or modeling technologies, described below. Users may access the server computer 208 by means of a network path associated therewith. The content management component 216 handles processes and technologies that support the collection, managing, and publishing of security and/or network data and information, and other data. The database management component 218 includes storage and retrieval tasks with respect to the database, queries to the database, and storage of data. In some embodiments, multiple server computers 208 each having one or more of the components 212-218 may be utilized. In general, the user computer 202 receives data input by the user and transmits such input data to the server computer 208. The server computer 208 then queries the database 210, retrieves requested pages, performs computations and/or provides output data back to the user computer 202, typically for visual display to the user.

Figure 3:
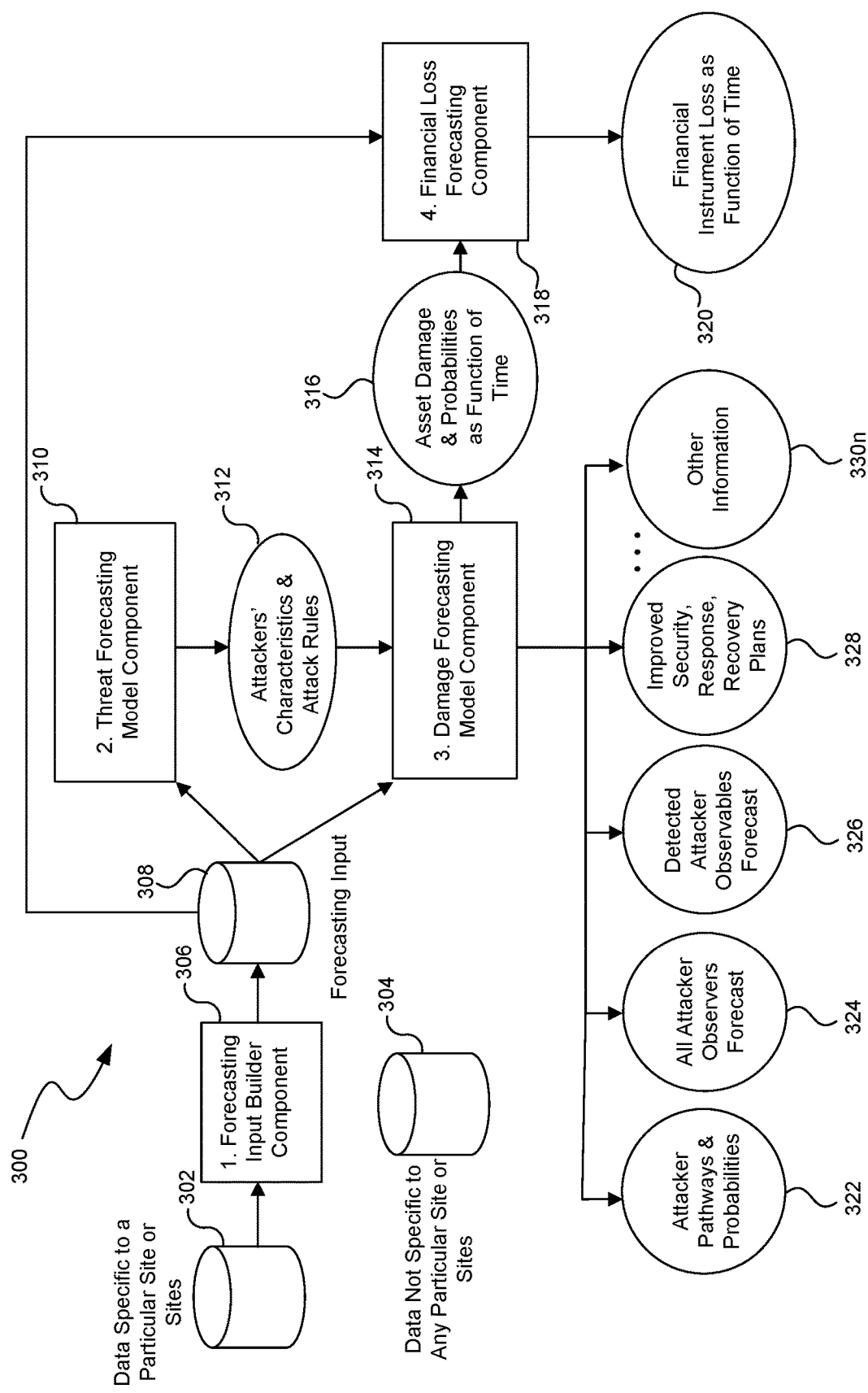
FIG. 3 is a diagram of data flow in an arrangement of components according to an embodiment of the described technology.

FIG. 3 is a diagram of data flow in an arrangement of components according to an embodiment of the described technology. The data that is specific to a particular site or sites 302 and data that is independent of any particular sites 304 are inputs to the forecasting input builder component 306, which creates the forecasting input 308. The forecasting input 308 is input to the threat forecasting component 310, the damage forecasting model component 314, and the financial loss forecasting component 318. In various embodiments, in one of the first steps to forecasting, the threat forecasting model component 314 computes the attackers' characteristics and attackers' attack rates 312, which is input to the damage forecasting model component 314. The damage forecasting component 314 in some embodiments computes the asset damage 316, and inputs this information to the financial loss forecasting component 318, which computes the financial instrument loss as a function of time 320. The damage forecasting component 314 can also compute, in one or more embodiments, information for cyber-security analysis and planning such as: attacker pathways and their probabilities 322; attacker observables 324; attacker observables that are caught by existing sensors and software 326; improved security, response, and recovery plans 328 and/or other information 330n.

FIG. 4 depicts a chart of embodiments of the described technology as they relate to sequenced staging of a forecasting model. Some of the examples of usage shown in FIG. 4 use multiple stages 402a-402c and iterations 406. Some embodiments 408 of the described technology use both single stage and multi-stage implementations. Shown are the inputs 402a and 402c and outputs 402b and 404 of each stage. The type of iteration 406 performed within a stage is described.

Figure 5:
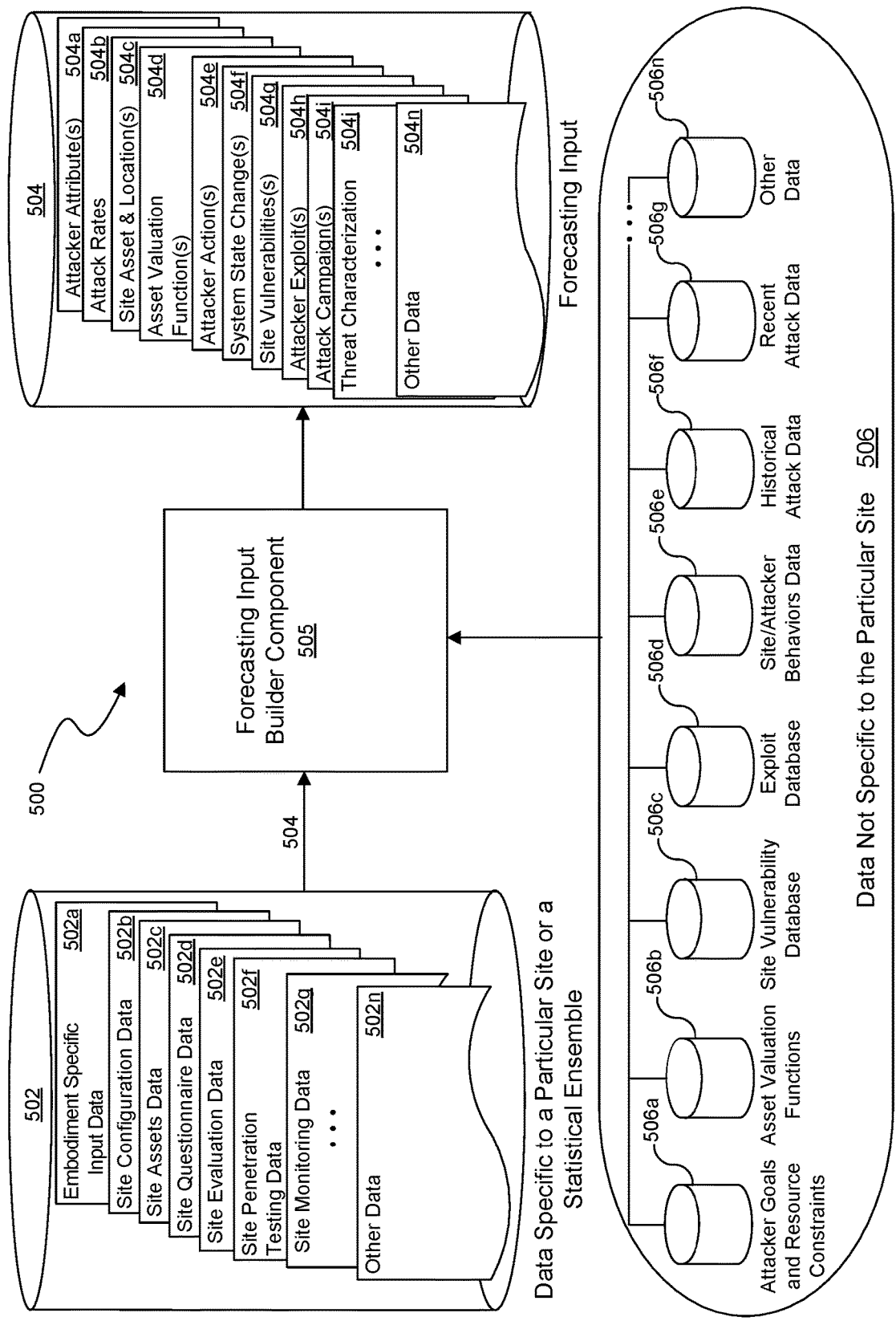
FIG. 5 is a block diagram of a forecasting input builder component and its inputs and outputs according to one or more embodiments of the described technology.

FIG. 5 is a block diagram 500 of a forecasting input builder component 505, data specific to a particular site and/or statistical ensemble 502, data not specific to a particular site 506, and a forecasting input 504. The forecasting input component 504 includes one or more site properties 504a-504n that are results of the forecasting input builder component's 505 processing of at least one or more data 502a-502n and one or more data 506a-506n, as described below. Data Specific to a particular site and/or statistical ensemble 502 include one or more of site configuration data 502b, assets data 502c, questionnaire data 502d, evaluation data 502e, penetration testing data 502f, monitoring data 502g, and other data (e.g., user-defined collection configurations or other data, such as to determine one or more of a detection rate and asset loss). Data not specific to a particular site 506, in some embodiments, includes attacker goals and resources 506a, asset valuations 506b, site vulnerability 506c, exploit database 506d, site/attacker behaviors 506e, and historic attack data 506f, recent attack data 506g, and/or other data 506n. These data collections, in one or more embodiments, are inputs for forecasting attacker attributes 504a, attack rates 504b, site and asset locations 504c, asset valuation functions(s) 504d, attacker action(s) 504e, system state changes(s) 504f, site vulnerabilities(s) 504g, attacker exploit(s) 504h, attacker campaign(s) 504i, threat characteristics 504j, and/or other data 504n.

As described above, the input to the forecasting input builder component 505 consists of the properties 502a-502n of a specific particular site and/or an ensemble of sites 502, and properties from data collections 506a-506n that are not specific to a particular site 506. Examples of embodiment-specific input data 502a are described in FIG. 13. Site configuration data 502b includes, in various embodiments, network topology and devices on the network. Site assets data 502c contain in one or more embodiments the type, location, quantity and/or size of assets. Site questionnaire data 502d is obtained from, for example, site personnel interviews for questions related to site configuration, personnel training, size of organization, function of organization, and security policies. Site evaluation data 502e is obtained from, for example, observations by an external reviewer. Site penetration test data 502f can be obtained by penetration experts and/or data. Site monitoring data 502g can be sourced from installed network and computer-based sensors that are manually and/or automatically collecting site information. The site properties are, in some embodiments, used to retrieve the appropriate information from the databases and collections 506a-506n: (a) historical attacker attributes 504a, attack rates 504b, attack campaigns 504i, and threat characterization information 504j are retrieved from the attacker goals and attacker resource constraints 506a; (b) asset valuation functions 506b are retrieved from the data collection; (c) the list of site vulnerabilities 504g is retrieved from the vulnerability data base 506c; (d) the appropriate list of corresponding possible exploits 504h is retrieved from the exploit data base 506d, (e) historical attacker action properties are retrieved from data collection 506e; and/or (f) historical attack campaign information 504i is retrieved from historical attack data 506f and recent attack data 506g. Various other combinations and/or associations of i) data specific to a particular site 502, ii) data not specific to a certain site 506, and iii) forecasting input 504 are contemplated. The above described relations are only one or more embodiments of the described technology.

Figure 6:
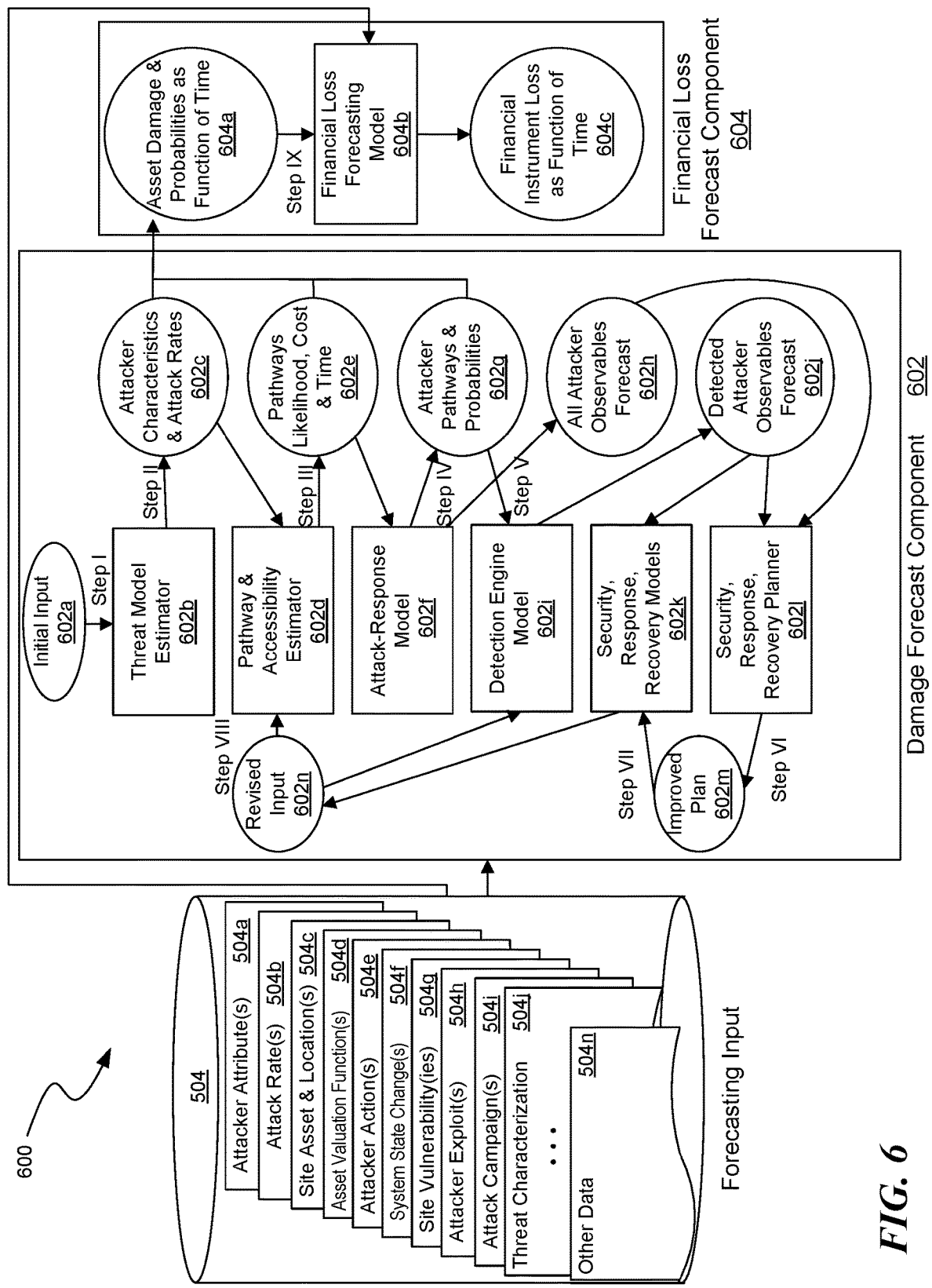
FIG. 6 is a block diagram of forecasting components and their inputs and outputs according to one or more embodiments of the described technology.

FIG. 6 is a block diagram 600 of forecasting components and their inputs and outputs according to one or more embodiments of the described technology. The forecasting input properties 504a-504n are used in some embodiments by the damage forecast components 602a-602n and financial loss forecast components 604a-604c.

At Step I, the threat model estimator 602b uses one or more of the forecasting input properties 504a-504n as initial input 602a to generate a candidate suite of likely attackers and/or attacker groups based on historical information and/or expert opinion. The threat model estimator 602b and/or other models or other components matches, at Step II, the characteristics of each attacker and/or attacker category to the site characteristics by estimating the reward-cost from the attacker's perspective. The result is one or more attackers' characteristics and attack rates 602c. In various embodiments, attackers' characteristics can include a probabilistic ranking of sites for each attacker and/or attacker category along with possible attack rates for each site, as determined by, for example, the total costs that can be incurred by each attacker or attacker category. At Step III, the pathway accessibility estimator 602d computes the possible pathways and their probability distributions of cost and time 602e based on the attackers' characteristics and attack rates 602c. The attackers' characteristics and attack rates 602c, in one or more embodiments, are computed for the particular site or category of sites under analysis.

At Step IV, the attack-response model 602f computes the probability of attacker pathways 602g on the basis of, for example, one or more reward-cost, detectability, and asset locations. In one or more embodiments, the described technology can also compute the forecast probability of observables 602h generated by the attackers.

In one or more embodiments, the attacker characteristics & attack rates 602c is input to the asset damage & probabilities as function of time 604a calculation, bypassing the pathway & accessibility estimator 602d. Similarly, the pathways likelihood, cost & time 602e can be input to the asset damage & probabilities as function of time 604a calculation, bypassing the attack-response model 602f. In various embodiments, the attacker pathways & probabilities 602g is input to the asset damage & probabilities as function of time 604a calculation, bypassing the detection engine model 602i.

At Step V, the detection and monitoring model 602i computes the probability of observables being detected 602j by, for example, monitoring appliances/sensors and/or detection software that are installed on the system.

At Step VI, the security, response, and recovery (SRR) planner 602l generates, based on the attacker observable forecast 602h, a new and/or improved plan 602m (e.g., in the form of data, metadata, database entries, and/or an electronic or physical report), which can be used to automatically or manually (e.g., via an administrator) configure or reconfigure assets the next time the SRR is executed. For example, the attacker observables forecast 602h and detected attacker observables forecast 602j in combination with the likely attacker pathways 602g determined by, for example, the pathway likelihood, cost and time 602e can be used to generate an improved plan 602m to increase the likelihood of detecting an incident. For example, the improved plan 602m may indicate or suggest installing new or reconfiguring existing security appliances and/or sensors at likely locations of intercepting high-damage attacker pathways.

At Step VII, the SRR model 602k is used by the described technology to forecast expected SRR actions. In various embodiments, the actions involve changing site configuration or policy, so the input is revised, which may include in some embodiments changes to detection and monitoring models 602i which, in various embodiments, can be used as revised input 602n for the pathway and accessibility estimator 602d.

At Step VIII, if the input was revised 602n in Step VII, the steps are repeated starting from Step III, using the revised input 602n.

At Step IX(a), in some embodiments, the financial loss forecasting model 604b of the financial loss forecasting component 604 uses the asset damages 604a, given as a probability distribution in time, that are computed by the damage forecast component 602. The described technology can, in various embodiments, use one or more forecasting input properties 504a-504n, such as the site asset and location information 504c and the asset valuation functions 504d to compute the resulting financial loss 604c as a probability distribution in time. In other embodiments, Step IX(a) is optional. For example, the path detection, tradeoff engine and/or reporting engine component 2328 can, at Step IX(b), receive the asset damages 604a, without traversing the financial loss forecasting model 604b.

Figure 7:
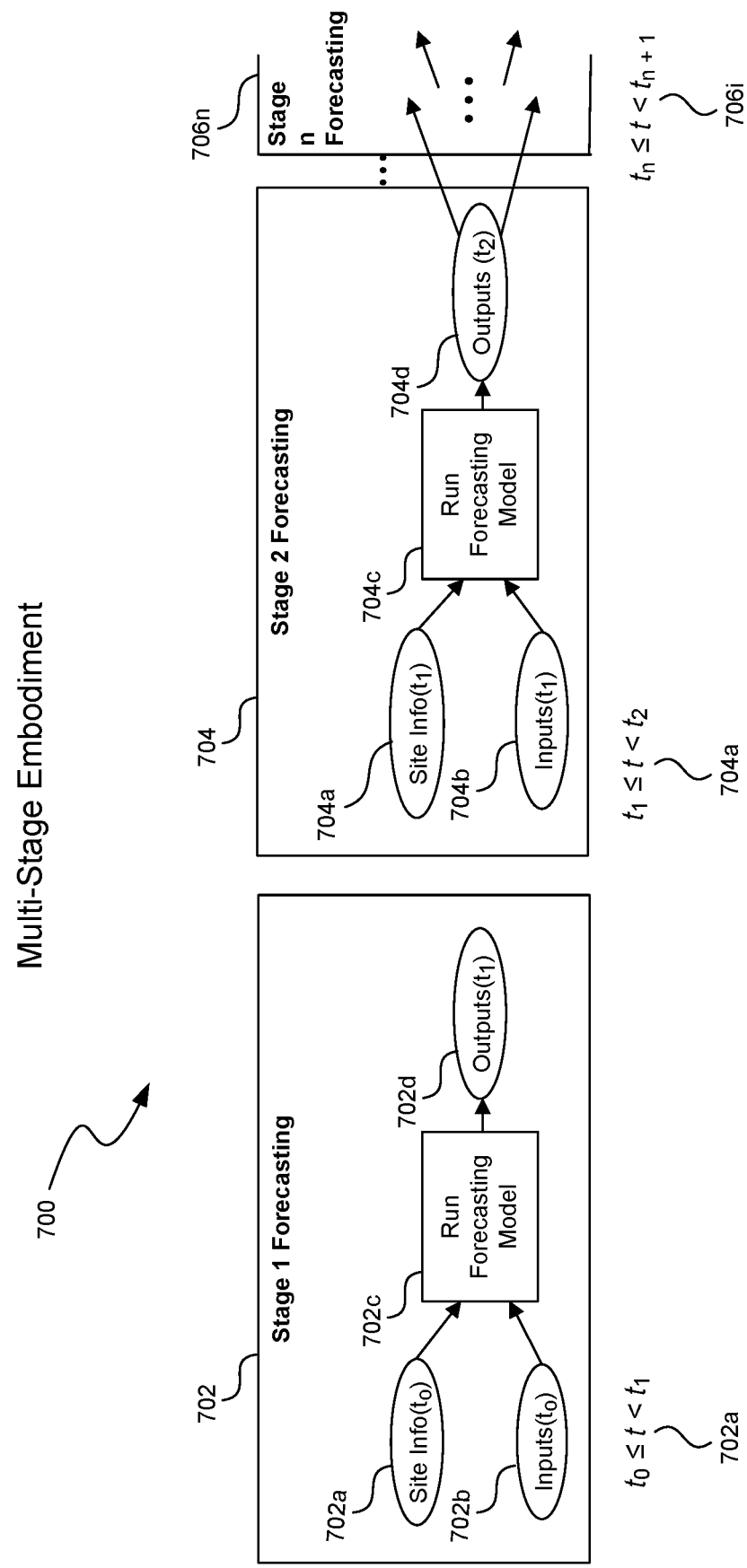
FIG. 7 is a block diagram of a multi-stage embodiment of the described technology with staged forecasts in time.

FIG. 7 is a block diagram 700 of a multi-stage embodiment of the described technology with staged forecasts in time. The block diagram 700 depicts one or more embodiments of the described technology that execute the damage forecasting component 602 of the described technology in multi-staged (e.g., stage 1 forecasting 702, stage 2 forecasting 704, and stage n forecasting 706n) sequences of time periods (702a, 704a, and 706i). Although the time periods (e.g., 702a, 704a, and 706i) are consecutive in the diagram, other time periods with gaps between stages are also covered in the described technology.

In one or more embodiments, forecasting is performed at the run forecasting model 702c in the first forecasting stage 702 over the forecast time period 702a: $t_0 \leq t < t_1$ with input site information 702a and various inputs 702b given at t=to. The output 702d at time $t = t_1$ contains, for example, new information on inputs, attacker states, system states, and site information which can be site input 704a and/or various inputs 704b to second stage forecasting model 704c that is run to forecast time period 704a: $t_1 \leq t < t_2$. Output(s) 704d at $t = t_2$ is passed to, in some embodiments, a next stage (e.g., stage n. forecasting 706n). In addition to time progression, in one or more embodiments the described technology can use of multiple stages such as the examples described in FIG. 3.

Figure 8:
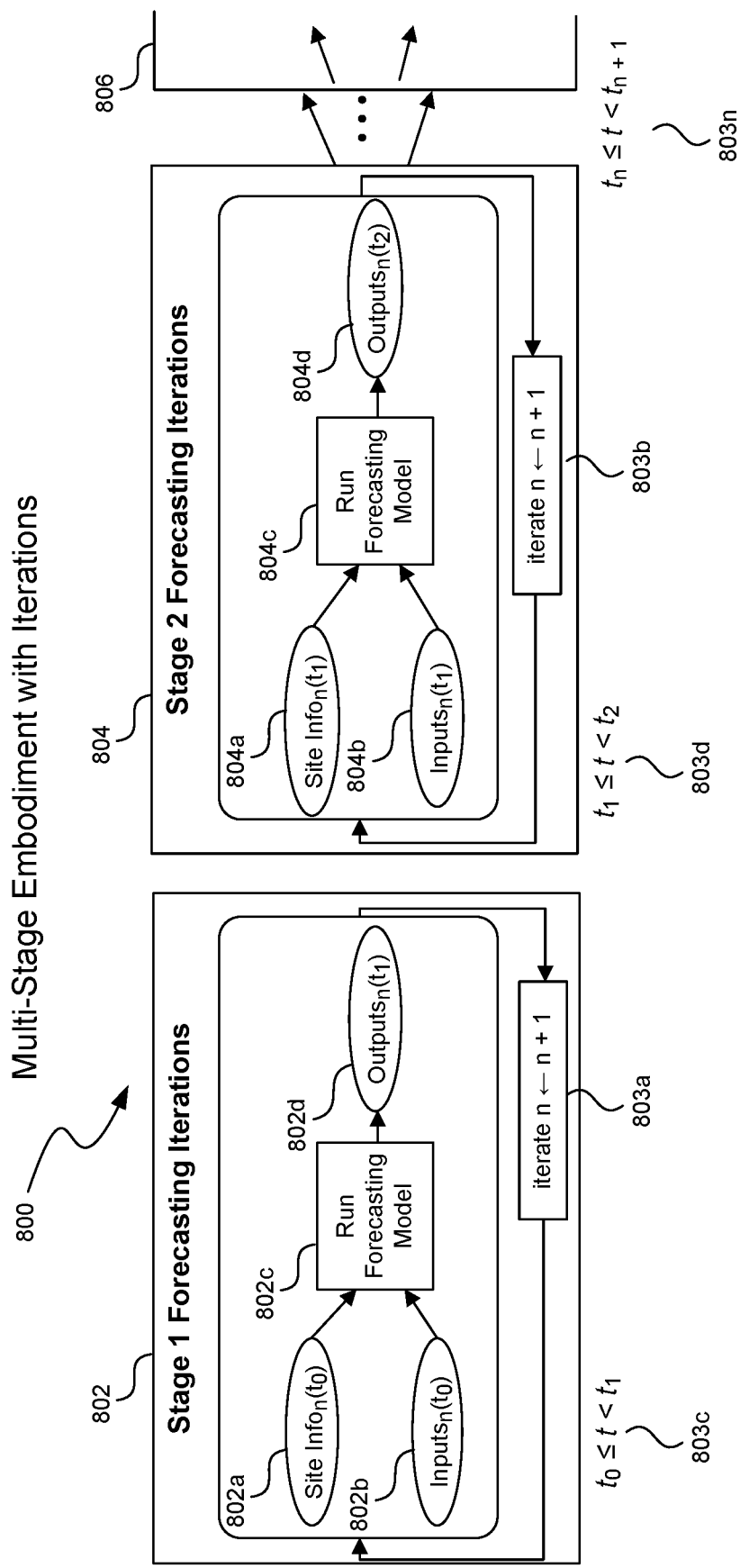
FIG. 8 is a block diagram of a multi-stage embodiment of the described technology with staged forecasts in time with the addition of iterations at each stage.

FIG. 8 is a block diagram 800 of a multi-stage embodiment of the described technology with staged forecasts in time with the addition of iterations at each stage. FIG. 8 is similar to FIG. 7 except that the damage forecasting model component (i.e., run forecasting model) 802c is called iteratively within each time period, so that iterations 803a and 803b are performed within each stage 802 and 804, respectively. Examples of iterative embodiments are, for example, solving a planning or parameter calibration problem.

Figure 9:
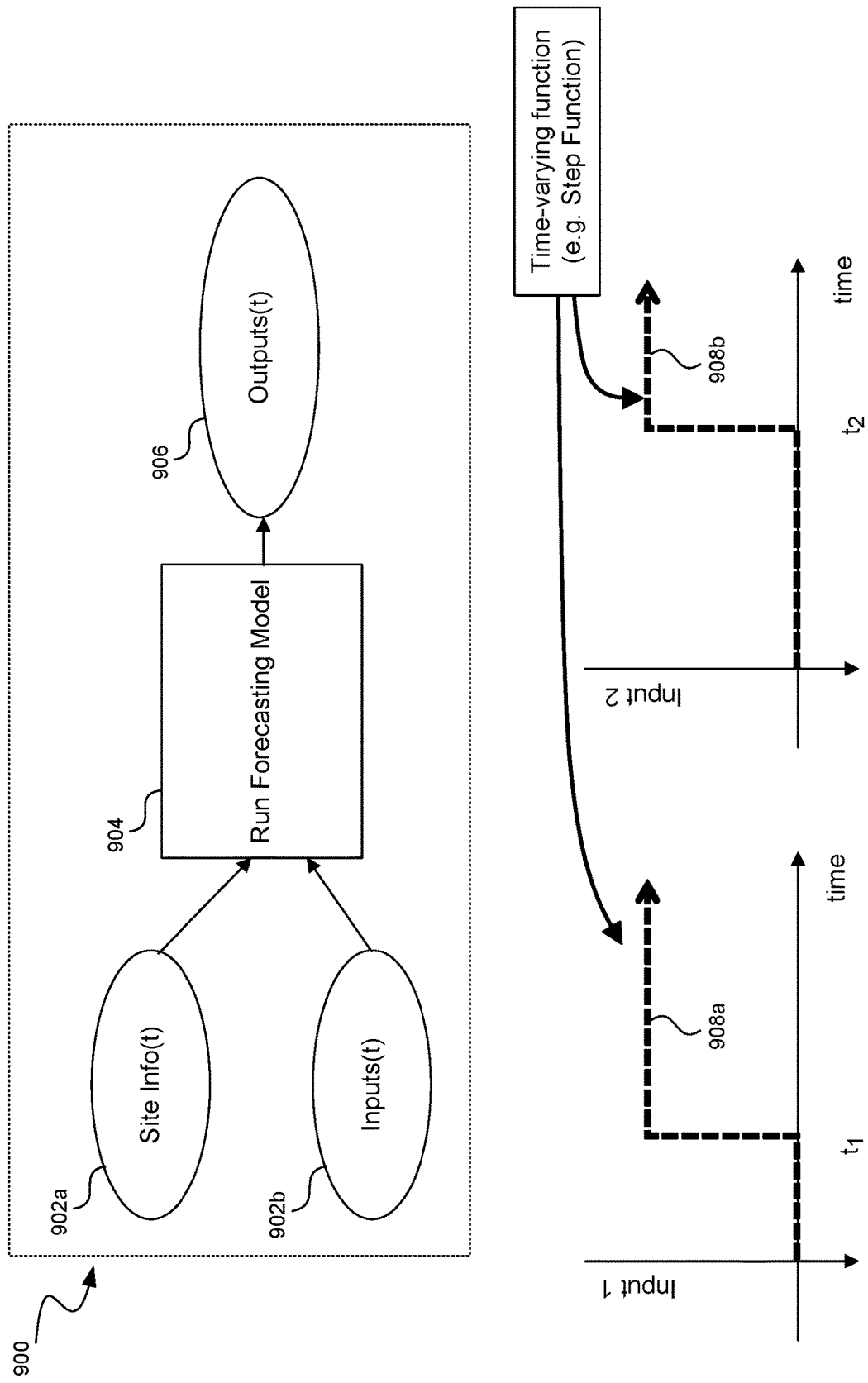
FIG. 9 is a block diagram of a non-staged embodiment of the described technology with time-functional propagation using time-varying input system state and associated probability density functions.

FIG. 9 is a block diagram 900 of a non-staged embodiment of the described technology with time-functional propagation using time-varying input system state and associated probability density functions. In the block diagram depicted in FIG. 9, run forecasting model 904 is associated with inputs(t) and outputs(t). Site information (Site Info(t)) 902a and other inputs(t) 902b and one or more outputs(t) 906 are functions of time, such as a time progression function that uses time-varying logical functions for site information 902a properties that are time-varying as well as for other inputs 902b. Forecast outputs 906 are, in some embodiments, time-varying. Step functions 908a and 908b can be used by the described technology to model binary states that turn on and off. Other inputs 902b can include general time-dependent probability distributions, for example, as described below in reference to FIG. 18.

Figure 10:
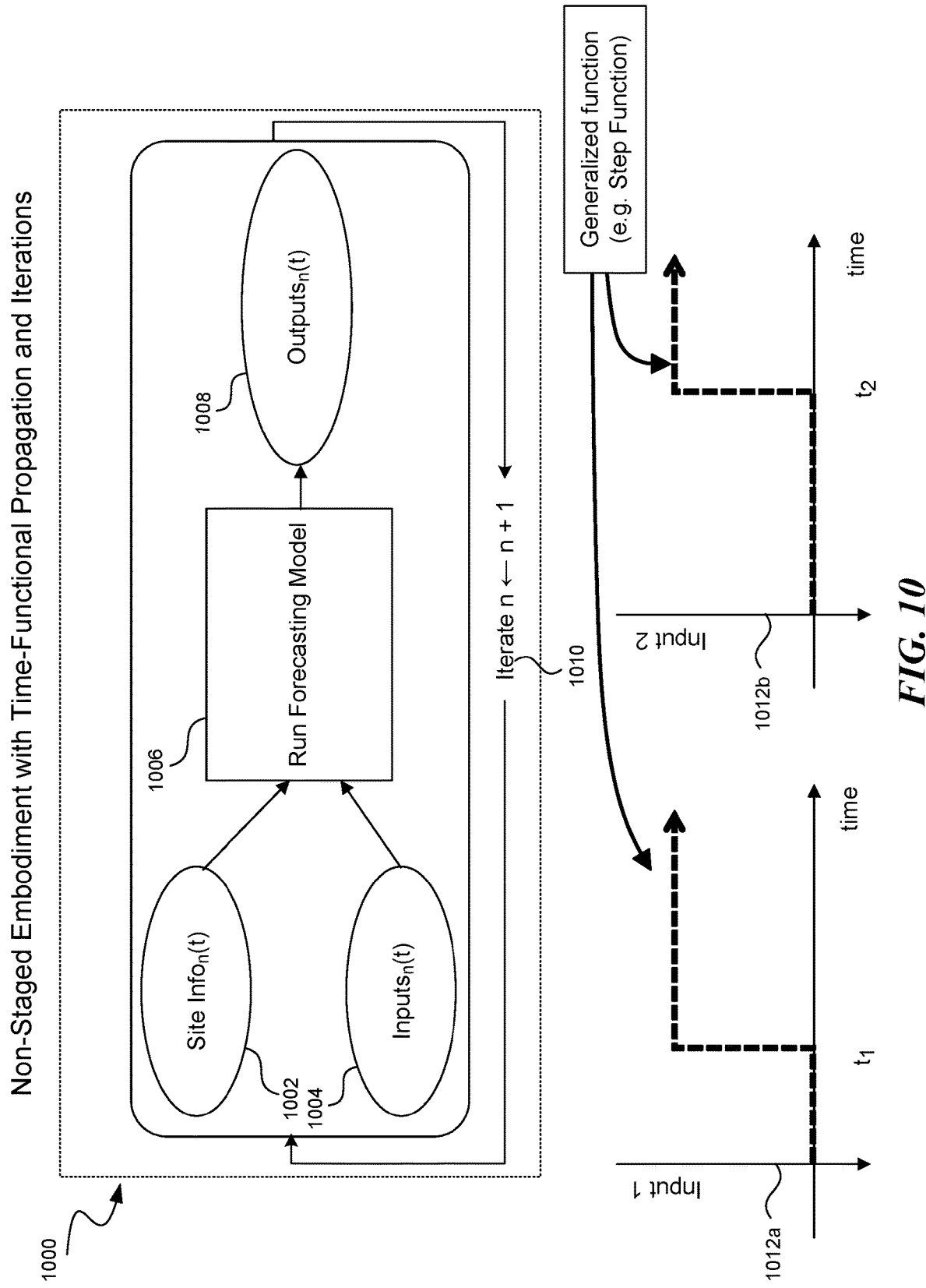
FIG. 10 is a block diagram of a non-staged embodiment of the described technology with time-functional propagation using time-varying input system state and probability density functions with the addition of iterations.

FIG. 10 is a block diagram 1000 of a non-staged embodiment of the described technology with time-functional propagation using time-varying input system state and probability density functions with the addition of iterations. In various embodiments, block diagram 1000 is an embodiment where the site info input 1002 and various inputs 1004 and outputs 1008 of the damage forecasting model 1006 are functions of time that are iteratively modified, such as for numerically solving a planning or parameter calibration problem by using time-varying logical functions (e.g., 1012a and/or 1012b) together with iterations 1010. Examples of embodiments of the described technology where one or more iteration is used is described at FIG. 3.

Figure 11:
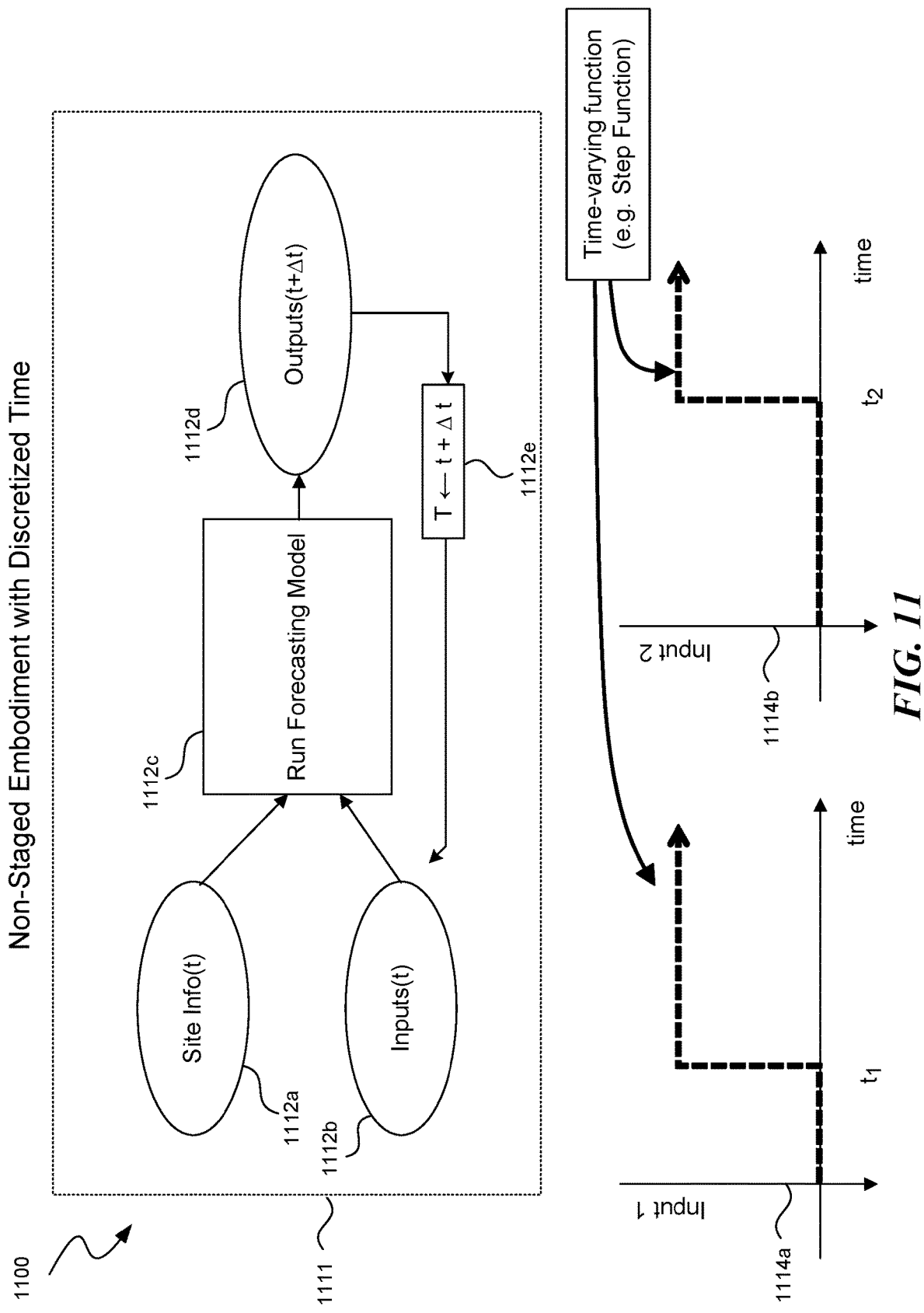
FIG. 11 is a block diagram of a non-staged embodiment of the described technology with time-varying functions and forecasting performed in discrete time steps.

FIG. 11 is a block diagram 1100 of a non-staged embodiment of the described technology with time-varying functions and forecasting performed in discrete time steps. Block diagram 1111 includes run forecasting model 1112c that, in one or more embodiments, is associated with inputs and outputs(t+Δt). The described technology, in some embodiments, modifies site information input 1112a and/or various inputs 1112b and one or more outputs(t+Δt) 1112d by discrete time steps (e.g., 1114a and/or 1114b) in order to approximate continuous model dynamics: such as performing an iteration 1112e at each one or more steps 1114a and 1114b. The inputs 1112a and 1112b, in some embodiments, start the iteration at time t and the output 1112 at the end of the iteration is at t+Δt 1112e.

Figure 12:
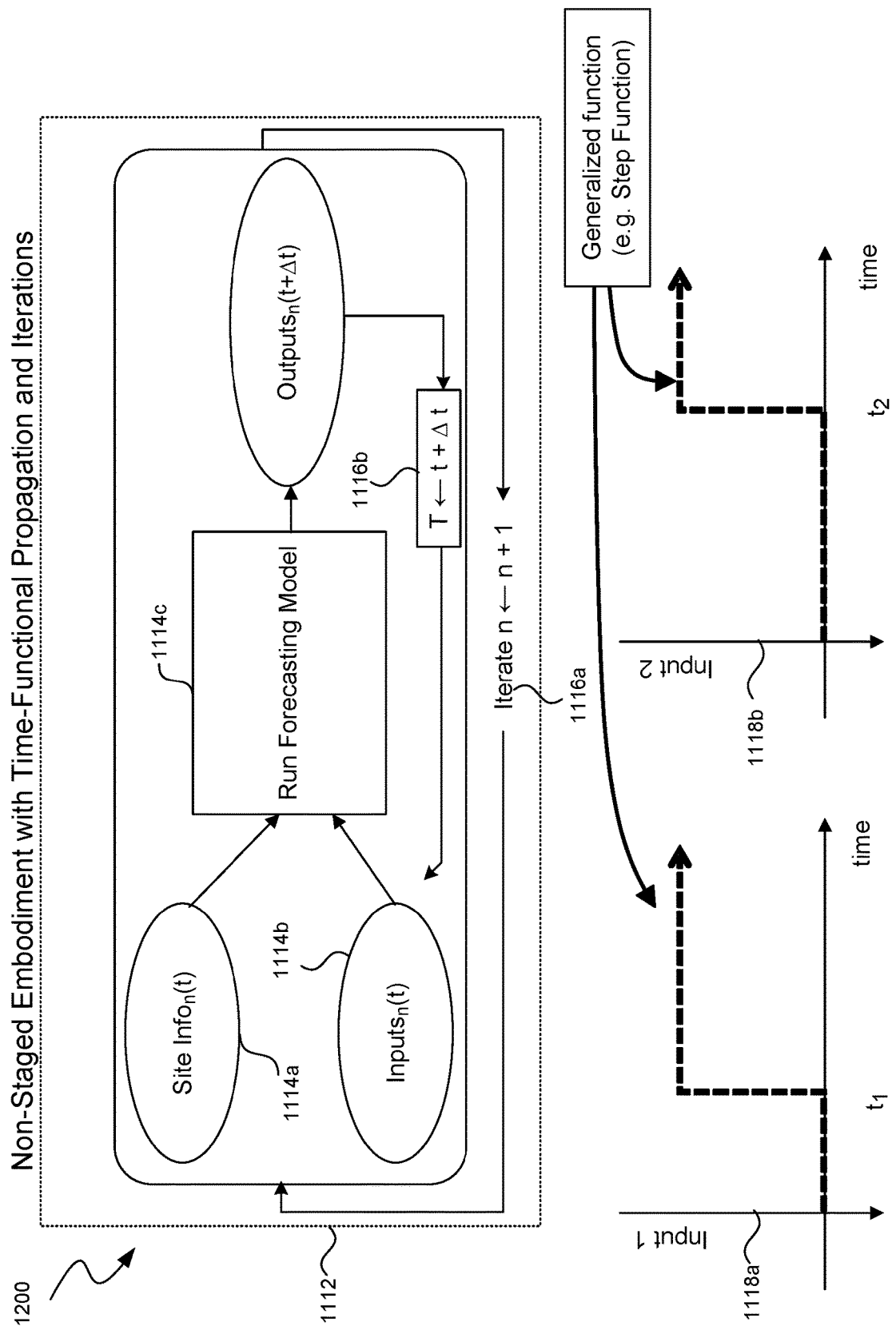
FIG. 12 is a block diagram of a non-staged embodiment of the described technology with time-functional propagation using time-varying input functions and forecasting performed in discrete time steps with at least one process iteration.

FIG. 12 is a block diagram 1200 of a non-staged embodiment of the described technology with time-functional propagation using time-varying input functions and forecasting performed in discrete time steps with at least one process iteration. Block diagram 1112 depicts one or more embodiments where one or more inputs 1114a and/or 1114b are modified by discrete time steps (1118a and 1118b) along with iterations within each time step (e.g., 1116a and 1116b) in order to solve, for example, a planning or parameter calibration problem.

In some embodiments of the technology described in FIGS. 5-10, one or more threat forecasting model component(s) 310 are used in conjunction with one or more damage forecasting model component(s) 314 in order to update one or more of the properties 504a-504n, such as attack rate(s) 504a. FIG. 4 describes various example usages of the described technology that use multiple stages and iterations.

Figure 13:
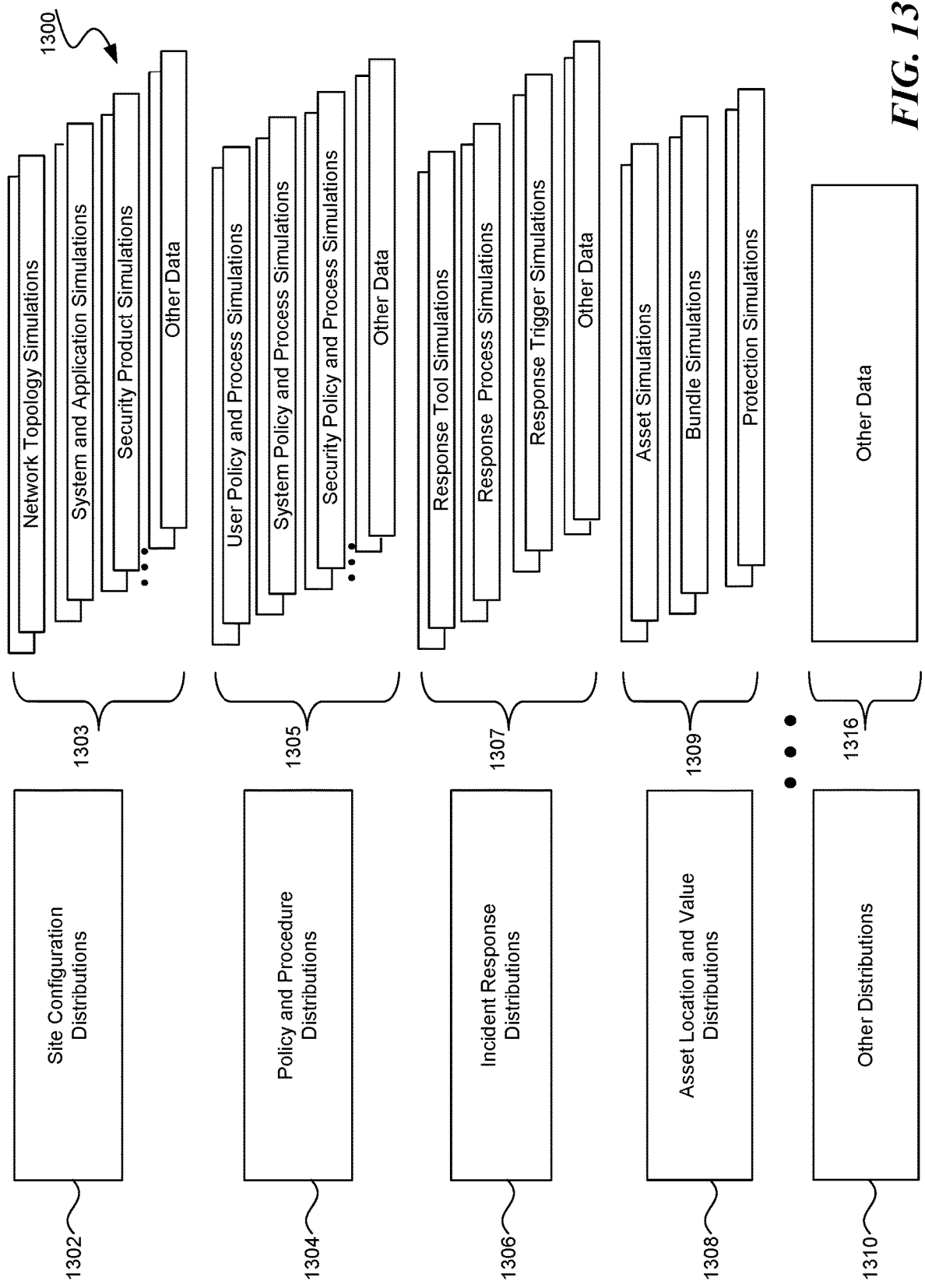
FIG. 13 is a block diagram of an embodiment of the described technology applied to analyzing a pool of sites that are described based on probabilities, or a specific site where characteristics are uncertain and site properties can be specified based on probabilities.

In some embodiments of the technology described in FIGS. 11-13, inputs to the forecasting models can be sampled using Monte Carlo or other sampling techniques in order to forecast the probabilistic propagation of uncertain model input values.

FIG. 13 is a block diagram 1300 of one or more embodiments of the described technology applied to analyzing a pool of sites that are described using probabilities, or a specific site where characteristics are uncertain and site properties can be specified using probabilities. Block diagram 1300 depicts site description probability distributions 1302-1310 as inputs to one of more embodiments of the described technology. Inputs may include but are not limited to site configuration distribution(s) 1302, site policy and procedure distribution(s) 1304, site and incident response distribution(s) 1306, asset location in the system and asset value distributions 1308 and/or other distributions 1310, such as site configuration distributions, in some embodiments, includes one or more simulations 1303, such as network topology, system and applications, security product, and/or other simulations and data. Policy and procedure distributions 1304, in various embodiments, include one or more simulations 1305, such as user policy and process, system policy and process, security policy and process and/or other simulations and data. Incident Response Distributions 1306, in one or more embodiments, can include one or more simulations 1307, such as response tool, response process, response trigger, and/or other simulations and data. Asset location and value distribution 1308, in some embodiments, includes various simulations 1309 such as asset, bundle, protections, and/or various other simulations and data. The described technology is not limited to the above-indicated distributions 1302-1310 and their respective simulations 1303-1316 and can include other distributions 1310 that are associated with other data 11316. In one or more embodiments, some or all distributions 1302-1310 are reduced to numerical values if they are known for a particular site.

Figure 14:
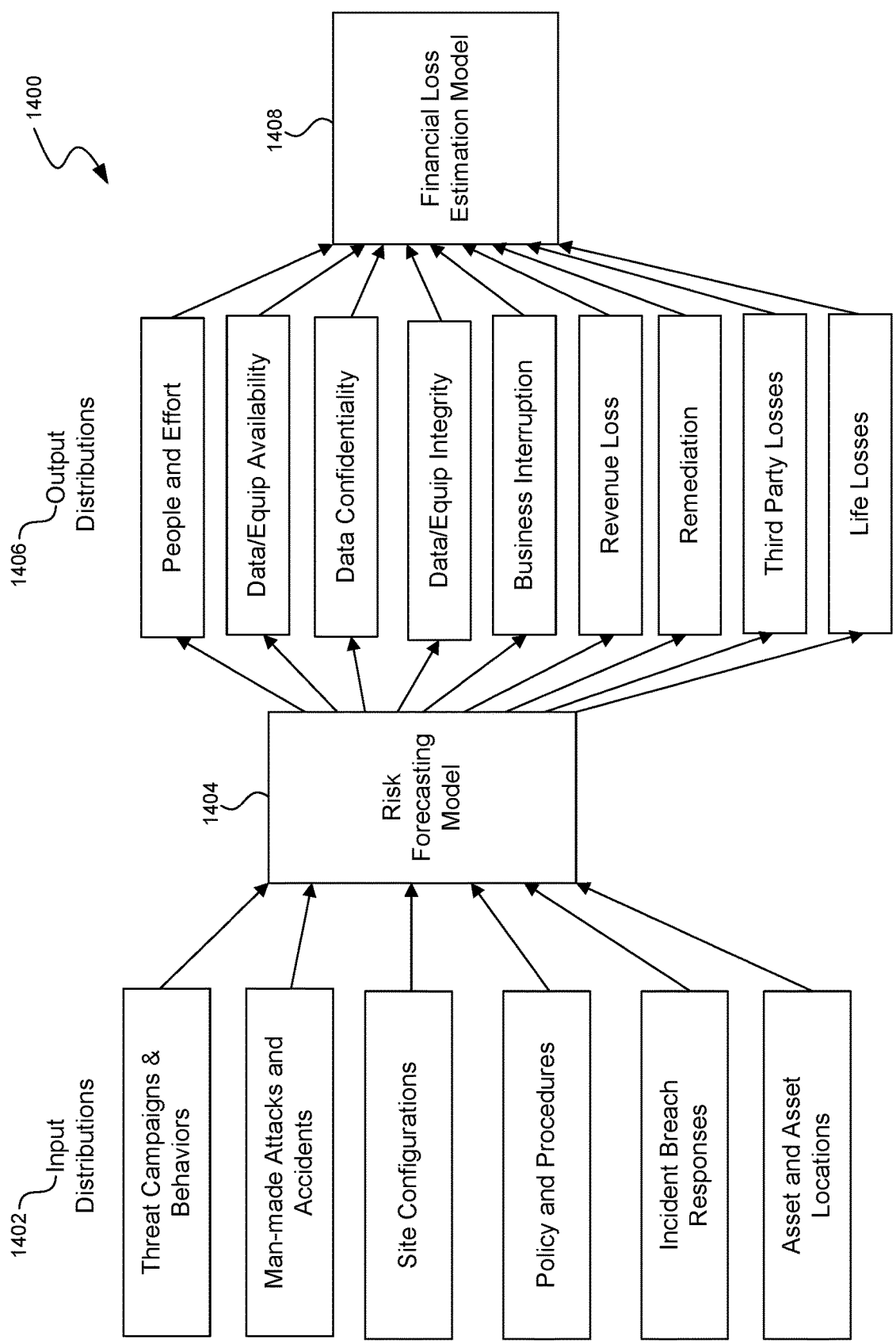
FIG. 14 is a block diagram of an embodiment of the described technology in which input distributions to the forecasting model produce output distributions that are used by a financial loss estimator model to compute probabilistic estimates of financial loss.

FIG. 14 is a block diagram 1400 of an embodiment of the described technology in which input distributions to the forecasting model produce output distributions that are used by a financial-loss estimator model to compute probabilistic estimates of financial loss. The block diagram 1400 depicts an embodiment of the described technology in which FIG. 14 takes input distributions forecasting 1402 are received by the risk model 1404 that produces output distributions 1406 that can be used by a financial loss-estimation model 1408 to compute probabilistic estimates of financial loss and/or other calculations.

Figure 15:
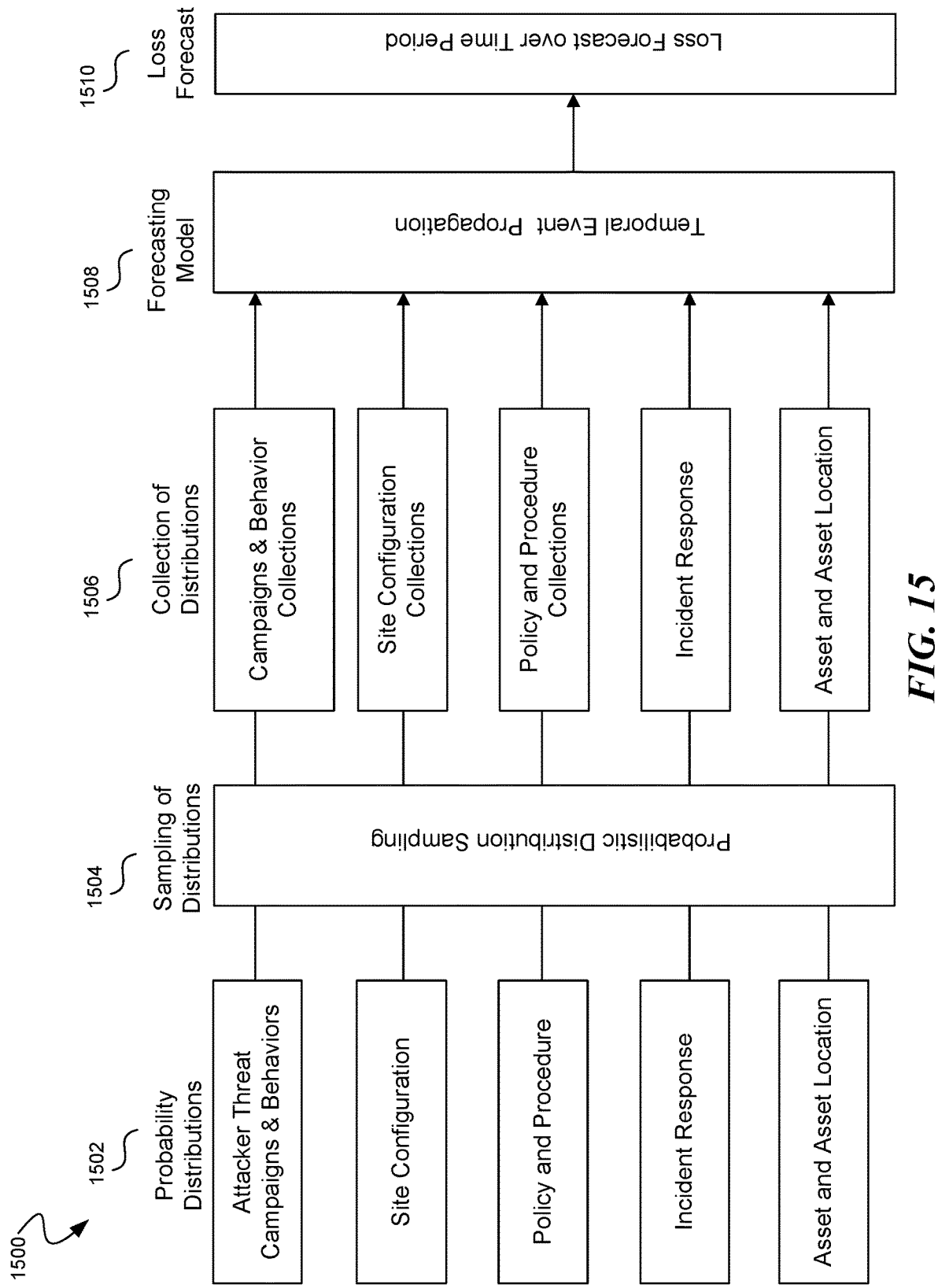
FIG. 15 is a block diagram of an embodiment of the described technology that uses the Monte Carlo method by sampling from the input distributions and simulating outcomes from forecast components.

FIG. 15 is a block diagram 1500 of an embodiment of the described technology that uses the Monte Carlo method by sampling from the input distributions and simulating outcomes from forecast components. The block diagram 1500 depicts an embodiment of the described technology that uses the Monte Carlo method by probabilistic sampling distributions 1504 from one or more input distributions 1502 to provide the distributions 1506 of the dependent properties that are needed to simulate outcomes from the risk forecasting model component 1508. The forecast outcome samples are converted by the described technology to output distributions that can be used to compute damage estimates for generating the probability of loss of assets 1510.

FIG. 16 is a block diagram 1600 of an embodiment of the described technology depicting list examples of financial loss forecast characteristics involved in a damage probability estimation that can be computed according to an embodiment of the described technology. FIG. 16 lists examples of the financial loss forecast characteristics involved in the damage probability estimation, including asset types 111, asset categories 112 and tangibility types 113, loss aggregation 114, damage types 115, loss types 116, including legal precedents and forecasts 117.

Description of Damage Forecasting Model Component

An embodiment of the forecasting model first decomposes possible attack scenarios into possible pathways of direct logically- or causally-related "path segments" that include, but are not restricted to, single or multiple events, actions, static states, and changes in states, or a combination thereof.

Figure 17:
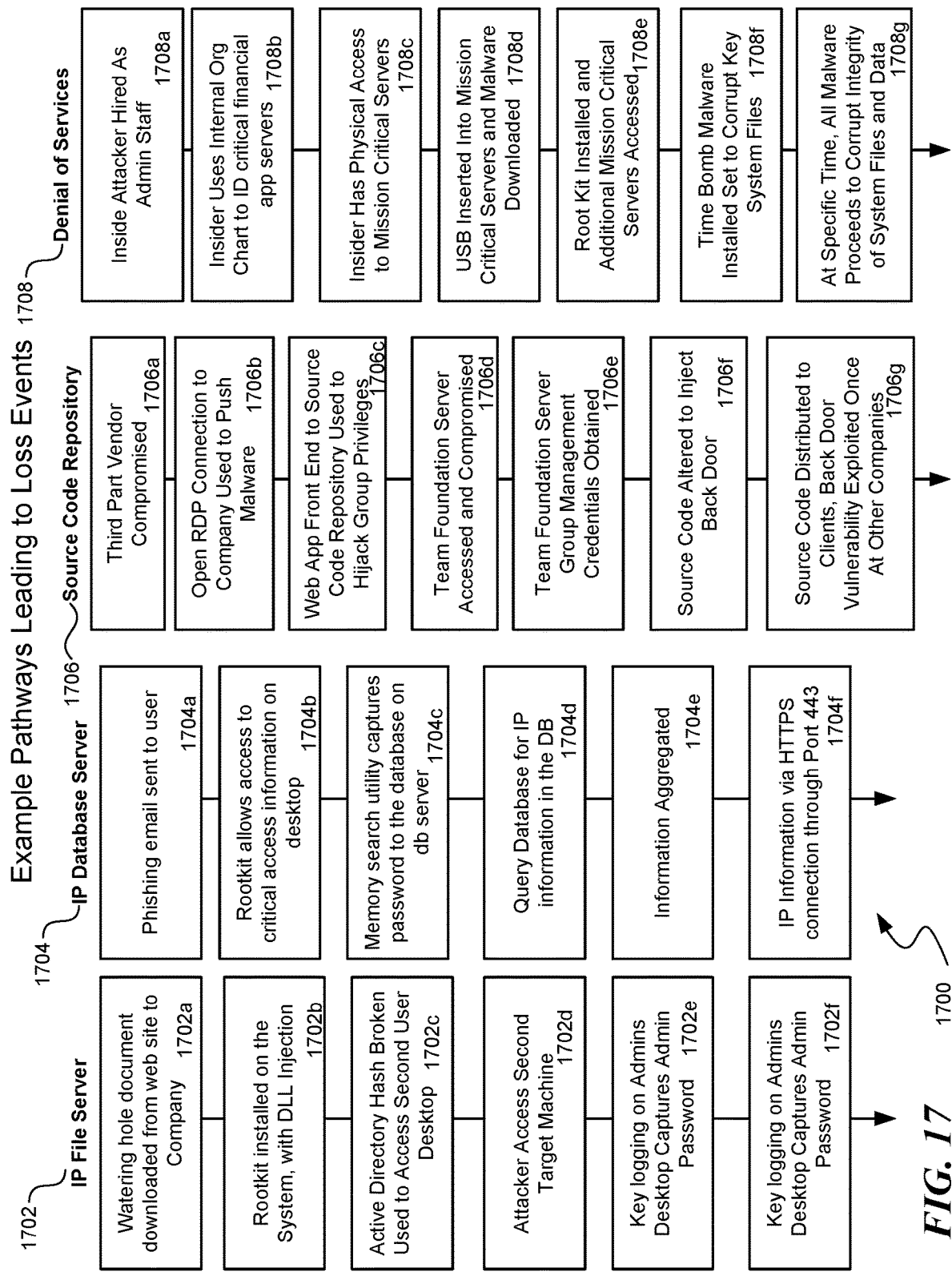
FIG. 17 depicts a flow diagram of pathways, according to one or more embodiments of the described technology, including exploits, preconditions and states achieved under an attack sequence.

FIG. 17 depicts a flow diagram 1700 of pathways, according to one or more embodiments of the described technology, including exploits, preconditions and states achieved under an attack sequence. One or more embodiments of the described technology are depicted in flow diagrams. The examples in the figure are highly simplified in that one or more of the embodiments do not depict possible pathway branching, detailed vulnerabilities and exploits, possible detection, and/or other features that are characteristic of pathways that can be treated by the described technology. For example, not shown are nodes for possible attacker observables created by attacker actions within a pathway and nodes for changes in system state resulting from attacker actions. Flow diagram 1700 includes a flow for the loss of IP from theft on a file server 1702, a flow for the loss of IP on a database server 1704, a flow for loss of source code 1706, and a flow for denial of server attacks 1708.

The path segments 1702a-1702f, 1704a-1704f, 1706a-1706g, and 1708a-1708g are specified by the user and/or are generated automatically from a higher-level specification of allowable behaviors, or a combination of both.

For the purposes of the present disclosure, path segments that have an associated time of occurrence will be called "event segments." Otherwise, they will be referred to as "static segments".

"Event segments" in various embodiments include events and actions, or any other segment that have an associated time of occurrence. Possible types of event segments include (but are not restricted to):

an action of the attacker (such as, e.g., executing an exploit);
a change in attacker state (such as, e.g., attacker network location, attacker desktop authentication level);
an action of a user (such as, e.g., clicking on an email attachment);
a change in user state;
an action of the system;
a change in system state;
an action of a software agent installed by the system administrator;
update in software or operating system version, including patching;
an action of a rootkit, malware, or software agent installed by the attacker;
an action by an insider threat;
an action by a system administrator;
an action by system response personnel;
insertion of a USB flash drive or other storage media by the user;
insertion of a USB flash drive or other storage media by an insider threat;
a detection of malware by a virus checker or other security software;
a detection of suspicious network activity by a security appliance; and/or
a security-related event at an affiliated organization (such as infection of a supplier's web site or a malware infection at a subsidiary that sends infected email attachments to the parent organization).

Static segments may include, but are not restricted to, static system states, system configuration information, security policies, asset locations and types, attacker goals, and/or any other logical preconditions that do not change over the time span of analysis.

In one or more embodiments, the segments may be considered as nodes in a directed-acyclic graph, where a segment A is a parent node of the node for segment B if A directly affects the condition or event of the segment B as a precondition. An event segment has the probability that the underlying event will occur over the time span of analysis together with the probability distribution for the associated time of event occurrence (event time). These probability distributions of the event time are specified by the user, read from data storage and/or are computed by propagation along segments of pathways. Static segments represent conditions that are static over the time span of analysis, so only the probability of the underlying condition is associated with the segment. These probabilities are specified by the user, read from data storage, and/or automatically determined by the described technology.

In various embodiments, the described technology can use continuous time or discrete time or a combination of continuous and discrete time to represent the event times. This includes, for example, use of integers or discrete symbols to represent and incorporate discrete times.

Linked sequences of segments can represent attacker or malware action pathways, sequences of actions by response personnel, or other sequences by humans or non-humans.

One or more actions by an attacker can include, but are not restricted to, execution of an exploit, reading data files, logging on to another computer, sniffing internet packets, listening for keystrokes by 'key logging', and transmitting stolen data, which can be represented by statements that describe logical conditions.

The described technology is able to construct pathways from path segments 1702a-1702f, 1704a-1704f, 1706a-1706g and 1708a-1708g specified through any structured language such that logical conditions and their preconditions are adequately described.

In one or more embodiments of the described technology, the underlying condition of a path segment, such as state value, events, actions, or changes in state, can be represented by descriptive mathematical logic statements. Event segments are described by a probability distribution of the time at which the change in logical condition occurred. Once a logic statement is true, it will be true until the end of the time span of interest. Logic statements of events that may change back to true can be modeled by using 'AND' statements.

The described technology is not restricted to describing the conditions of path segments by converting the logical condition of path segments to mathematical logic statements. Other methods, such as descriptive phrases, may be used by the described technology.

The embodiments of the described technology allow for a description of attacker or system actions or changes in state at any desired degree of specificity, and are not restricted to a detailed description of an action and/or changes in state at the lower system level, such as detailed malware actions. An event can be modeled by a high level of description of an event or condition or by including the low-level events which imply the high-level event. The described technology can be modeled at various hierarchies of detail on the basis of fidelity requirements and level of data detail. For example, in various embodiments, existing and future cyber-related behaviors are modeled in hierarchical levels of detail with regard to the description of attacker events and associated system exploits, vulnerabilities, assets, observations, and configuration. The level of detail is automatically selected by the described technology and/or selected by the user, for example, based on the level of threat information and required site attributes available, such as from questionnaires and other information that are deemed important to modeling a single site or a diverse portfolio of sites. Using this method, partially known threat related information can be dynamically aggregated with other known or partially known threat information as it is discovered. The aggregated threat information can be represented at different levels of aggregation of cyber threat information (e.g., metadata or semi-structured data). The metadata can be used by the described technology for progressively improving the resolution of the model.

Each event segment, in some embodiments, has an associated time of occurrence (event time $t_E$), which the described technology can compute as a cumulative probability distribution $P(t<t_E|E)$ conditioned on the event E happening. Various embodiments also can include a probability $P(E)$ of the event ever happening at the time period of interest. Thus, the probability of the event occurring at time t such that $t<t_E$ is given by the product:

$$P(t<t_E)=P(t<t_E|E)P(E).$$

Another embodiment of the described technology includes an event segment that has the actual event time distribution $P(t<t_E)$ along with $P(E)$, and not $P(t<t_E|E)$.

An embodiment of the described technology can use a combination of these two approaches, or any other approach where the event time probability distribution is propagated from the parent segments down to their common child segment.

In one or more embodiments, the path segments 1702a-1702f, 1704a-1704f, 1706a-1706g, 1708a-1708g and their connections may be represented by a "condition graph" which is a directed graph of "condition nodes", where a path segment is a node and a directed link points from the parent node A to a child node B if the condition for A is a precondition or part of the precondition to B. If a child node has multiple parent nodes that are event nodes representing a disjunction of the event nodes, then an embodiment of the method duplicates the child node such that each child node has only a single event node, but with all static parent nodes maintained. In some embodiments, the child node is not duplicated but the disjunction of the parent nodes is kept. The duplication of nodes has the advantage of easier propagation of event times but requires more memory.

The described technology, during construction of the condition graph, can keep track of whether a node A has an ancestor node that is the same as node A. If so, the node is duplicated. This step in the procedure reduces or eliminates the occurrence of temporal cycles. The probability distributions for an action that has duplicate nodes, in one or more embodiments, aggregate the results of the node along with its associated duplicate nodes.

The event probability for a node with no parent is assumed to be known, such as from data statistics or expert opinion, or else it is prescribed. A node representing a prescribed static or time-varying state of the system or a policy is an example of a logical node with no parent.

The attack event probability for a logical node B with a parent node A is, in one or more embodiments, the product of (1) the probability that the logical condition of parent node A is true, (2) the conditional probability that the logical condition of node B is true given that the logical condition of parent node A is true, and (3) the probability of successful execution of the event, including any required exploits, at node B by the attacker.

The probability of successful execution of an exploit consists of multiple factors, including probabilities for existence of exploits, system vulnerabilities, and sufficient attacker knowledge and skillset.

The multiple factors can be represented by a single node with a conjunction of multiple statements or by multiple nodes consisting of elementary or basis logical conditions.

A 'basis logical condition' either is an elementary logic statement or belongs to a set of conditions specified by the user. Typically, a basis logical condition is one where there is information regarding probabilities.

A vulnerability includes a condition that, in various embodiments, allows possible execution of a set of functions of a software or hardware component by a user who is not authenticated to perform these functions. A vulnerability may be intentional or non-intentional. An example of an intentional vulnerability is the case where the software designer adds a back door. A non-intentional vulnerability can arise either from faulty design or from improper implementation of a non-faulty design. A non-intentional vulnerability in a component can also arise if the initial design did not include the possibility of vulnerability from future changes in the rest of the system. Another type of vulnerability is a software and/or hardware condition which allows the possible usage of a function or set of functions of a software or hardware component outside the normal intended usage of the component, but does not require changes in authentication. An example is examination of information in working memory managed by the operating system.

An embodiment of the described technology can choose to transform the graph or part of the graph by means of procedures that are known to a practitioner with knowledge of the state of the art, such that each transformed node in the new graph is a basis logical condition or is a logical junction node of type 'OR' or 'AND.' Each basis logical condition node, in one or more embodiments, has at most one parent and that parent is either another basis logical condition node or is a logical junction node.

In one or more embodiments, the described technology first transforms the graph such that each logical condition of a node is decomposed into disjunctions and conjunctions of basis logical conditions. For each disjunction of statements $U_1, U_2, \ldots$, the method creates a new 'OR' node and its parent nodes are the nodes for statements $U_1, U_2, \ldots$. For each conjunction of statements $V_1, V_2, \ldots$, the described technology creates a new 'AND' node and its parent nodes are the nodes for statements $V_1, V_2, \ldots V_n$. These operations are repeated until only basis logical conditions are left in the graph.

Various embodiments can perform the transformation by converting each logical condition to conjunctive normal form that consists of a conjunction of logical conditions, where each logical condition is a disjunction of basis logical conditions. We create an 'AND' node for each conjunction and have 'OR' nodes as its parents. Each 'OR' node has its associated basis logical condition as its parents.

In one or more embodiments, the described technology performs the transformation by converting each logical condition to disjunctive normal form, which, by definition, consists of a disjunction of logical conditions, where each logical condition is a conjunction of basis logical conditions. We create an 'OR' node for each disjunction and have 'AND' nodes as its parents. Each 'AND' node consists of its associated basis logical conditions as its parents.

Figure 18:
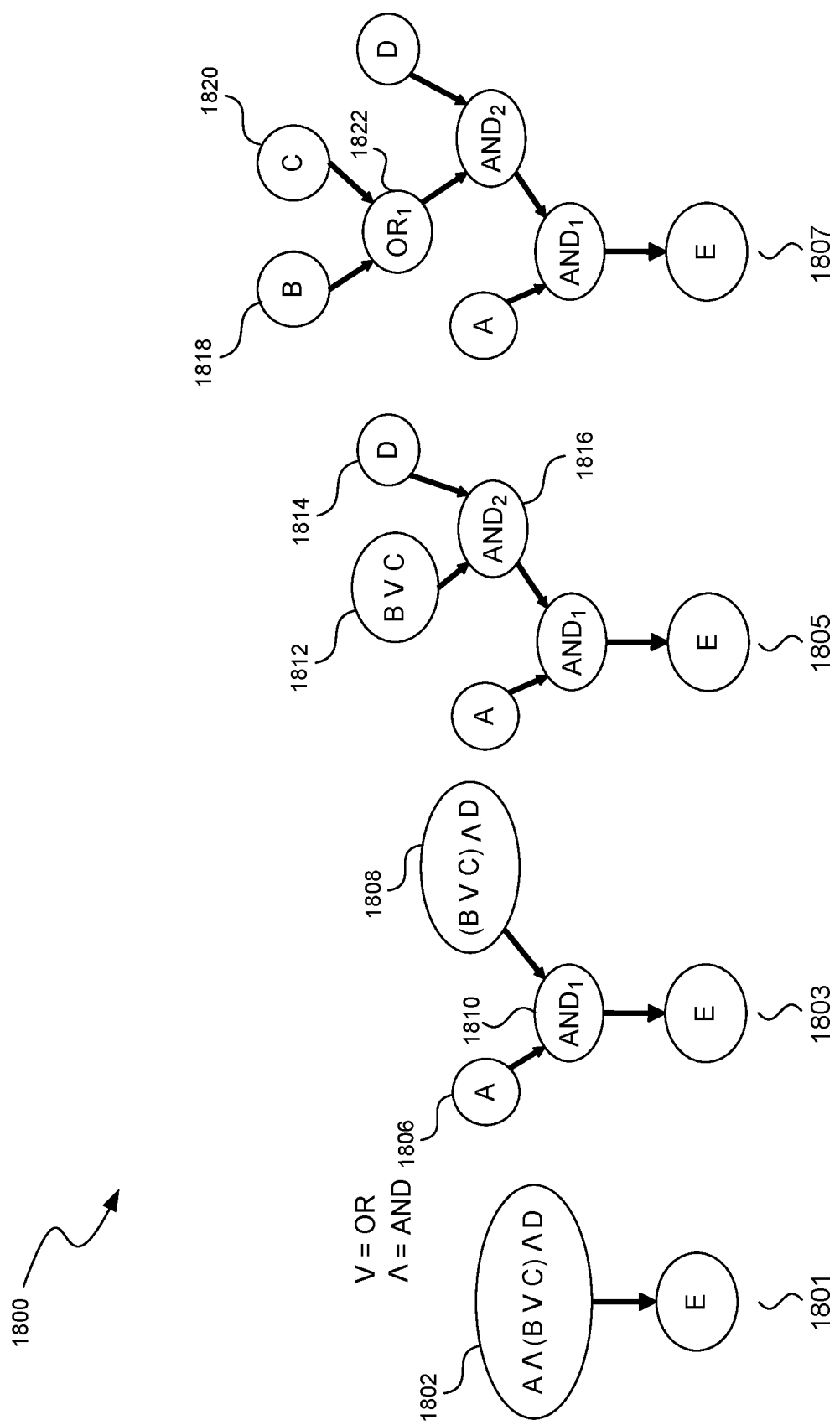
FIG. 18 is a graph of a combination of conjunctive and disjunctive attack sequences converted to a graph with only basis logical expressions, and conjunction and disjunction nodes according to an embodiment of the described technology.

An example of the steps in the above procedure is given in FIG. 18.

FIG. 18 is a graph 1800 of a combination of conjunctive and disjunctive attack sequences converted to a graph with only basis logical expressions, and conjunctions and disjunctions as nodes attack sequences according to an embodiment of the described technology. Graph 1800 includes 1801, 1803, 1805, and 1807, each having respective nodes. The complex logical condition of node 1802 is broken down into input nodes 1806 and 1808 by creating a conjunction node 1810. The node 1808 is broken down into nodes 1812 and 1814 by creating another conjunction node 1816. Node 1812 is broken down into nodes 1818 and 1820 by creating a disjunction node 1822.

In one or more embodiments, the described technology then computes, at each node in the graph: the probability of the event ever occurring, the distribution of the event time conditioned on the event occurring, the probability that the attacker is ever detected at a node, and/or the distribution of the time that the attacker is detected conditioned on the attacker being detected, as depicted in FIG. 17.

Figure 19:
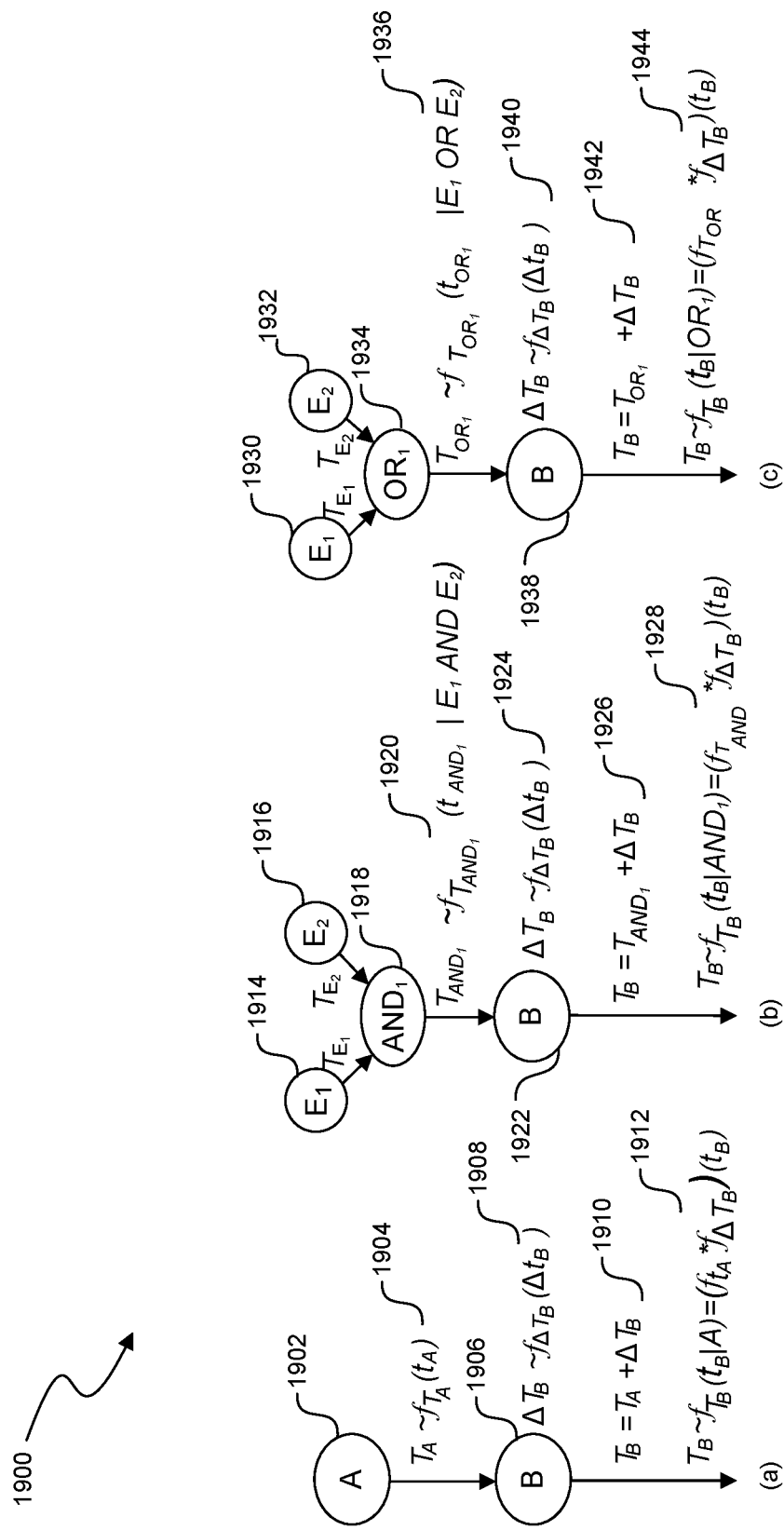
FIG. 19 depicts a graph of example distributions of event times that can be mathematically propagated in time across a single node, and across disjunctive and conjunctive nodes according to an embodiment of the described technology.

FIG. 19 depicts a graph 1900 of example distributions of event times that can be mathematically propagated in time across a single node, and across disjunctive and conjunctive nodes according to an embodiment of the described technology. Distributions can be propagated analytically, by Monte Carlo or deterministic sampling, or by a combination of methods. In graph 1900, the node "A" 1902 is the parent of node "B" 1906. The event time of the event for "A" 1902 obeys a probability distribution 1904. The probability distribution for the time required to execute event "B" 1906 is given by equation 1908. The event time for "B" 1906 is given by 1910. Its probability distribution is given by the convolution of equation 1912. The middle distribution, in graph 1900, includes a node "B" 1922. The event time for "B" 1922 is computed for the case where the parent of "B" is a conjunctive node. The event time is given by 1926 where the event time of the conjunction node is given by 1920. The probability distribution of the event time of "B" is given by the convolution 1928. In the third distribution ("C"), the event time for "B" 1938 is computed when the parent of "B" is a disjunctive node. The event time is given by 1942 where the event time of the disjunction node is given by 1936. The probability distribution of the event time of "B" 1938 is given by the convolution 1944. The probability distribution for the time required to execute event "B" 1906 is given by equation 1940.

To describe how the described technology can compute the event probability at a node, consider first a logical junction node. The event probability of an 'OR' node is computed as the sum of the event probabilities of its parent nodes. The event probability of an 'AND' node is computed as the product of the event probabilities of its parent nodes. These formulas are well known from the naive Bayes assumption.

A technique used by the described technology to compute the probability distribution of event times at each event node is described for an embodiment in which the random variable for event time is conditioned on the node event occurring at the relevant analysis time period. For example, consider an event node that is an 'AND' logical junction node. Let $T_1, T_2, T_3, \ldots$ be the random variables for the event times of the parent nodes. Since the event at the 'AND' node can occur only if all of the parent nodes can occur, the event time of the node is equal to:

$$T_{AND} = \max(T_1, T_2, \ldots),$$

given that all parent events $E_1, E_2, \ldots$ occur.

We assume that the $T_1, T_2, \ldots$ are statistically independent, and that parent events $E_1$ and $E_2$ are independent, as is assumed in a "naive Bayes" assumption.

We consider the case of two parent nodes 1 and 2. The general case follows by recursion or mathematical induction. We have the event time at the 'AND' node as $$T_{AND} = \max(T_1, T_2),$$

given that both $E_1$ and $E_2$ occur.

The probability distribution of a random variable is represented by its cumulative probability function. The cumulative conditional probability function for $t_{AND}$ can be derived as $$F_{T_{AND}}(t \mid E_1, E_2) = P(t < T_{AND} \mid E_1, E_2) =$$
$$F_{T_1}(t \mid E_1) F_{T_2 - T_1}(0 \mid E_1, E_1) + F_{T_2}(t \mid E_2) \cdot (1 - F_{T_2 - T_1}(0 \mid E_1, E_1)).$$

The described technology includes not only the treatment when the event times are continuous random variables, but also treatment of event times as discrete values, or a combination of continuous and discrete times. The expression for the cumulative probability function given above also applies to any or all such cases.

The probability density or mass function of $T_{AND}$ is computed from the cumulative probability distribution as $$f_{T_{AND}}(t \mid E_1, E_2) = f_{T_1}(t \mid E_1) F_{T_2 - T_1}(0 \mid E_1, E_1) + f_{T_2}(t \mid E_2) \cdot (1 - F_{T_2 - T_1}(0 \mid E_1, E_1)).$$

For discrete times or a combination of continuous and discrete times, the probability mass measure is used instead of densities.

The event at an 'OR' logical junction node occurs if any of the parent node events occur, so that the corresponding random variable for event time is $$T_{OR} = \min\{T_i\},$$

where the $T_i$'s are the event times for the respective events $E_i$'s that occur, of which at least one must occur.

We consider the case of two parent nodes 1 and 2. The general case follows by recursion or mathematical induction.

$$T_{OR} = \begin{cases} T_1, & \text{if } E_1 \text{ occurs, but } E_2 \text{ does not occur,} \\ T_1, & \text{if } E_1, E_2 \text{ both occur and } T_1 < T_2, \\ T_2, & \text{if } E_1, E_2 \text{ both occur and } T_1 \geq T_2, \\ T_2, & \text{if } E_1 \text{ does not occur, but } E_2 \text{ occurs.} \end{cases}$$

The cumulative conditional probability distribution for $t_{OR}$ is:

$$F_{T_{OR}}(t \mid E_1 \text{ or } E_2) = P(t < T_{OR} \mid E_1 \text{ or } E_2) = a_{OR} F_{T_1}(t \mid E_1) + b_{OR} F_{T_2}(t \mid E_2),$$

where $$a_{OR} = P(E_1)[1 - F_{T_2 - T_1}(0 \mid E_1 \text{ or } E_2) P(E_2)] / P(E_1 \text{ or } E_2),$$

$$b_{OR} = P(E_2)[1 - (1 + F_{T_2 - T_1}(0 \mid E_1 \text{ or } E_2) P(E_1)] / P(E_1 \text{ or } E_2),$$

$$P(E_1 \text{ or } E_2) = P(E_1) + P(E_2) - P(E_1) P(E_2).$$

The expression for the cumulative probability function given above also applies to the case of discrete event times.

The probability density or mass function of $T_{AND}$ is computed from the cumulative probability distribution as:

$$f_{T_{OR}}(t \mid E_1 \text{ or } E_2) = a_{OR} f_{T_1}(t \mid E_1) + b_{OR} f_{T_2}(t \mid E_2).$$

For a combination of continuous and discrete times, the convolution of probability mass measures can be used by the described technology.

For a head node corresponding to a basis logical condition without a parent node, the event time distribution, in one or more embodiments, is specified and can be found, but is not restricted to being found, from statistical analysis of data or by expert opinion. A head node can be, but is not restricted to being, an entry point into the system.

For a node "B" (i.e., nodes 1906, 1922, and/or 1938) corresponding to a basis logical condition that has a parent node A, the event time distribution is given by:

$$T_B = T_A + \Delta T_B,$$

where $\Delta t_B$ is the time required for an action or state change to finish from the time that it began. If the node "B" refers to an attacker action, then $\Delta T_B$ is the time for the attacker to accomplish the action, conditioned on the action succeeding. The distribution for $\Delta T_B$ depends on the attacker attributes and the system configuration.

If the node "B" refers to a change in attacker state, then $\Delta T_B$ is the time required for the attacker state to change, conditioned on the change occurring.

If the node "B" refers to a system action, such as in response to an attacker's action, including detection by a security device, then $\Delta T_B$ is the time for the system to perform the action conditioned on the action succeeding. If the node "B" refers to a system state changing, such as in response to an attacker's action, including detection state in a security device, then $\Delta T_B$ is the time for the system to change its state conditioned on the state change occurring.

For an embodiment using continuous time, the probability density function for $T_B$ can be given by:

$$f_{T_B}(t) = (f_{T_A} * f_{\Delta T_B})(t),$$

where the asterisk stands for the mathematical convolution operation.

For an embodiment using discrete time, the probability mass function of $T_B$ is given by the discrete convolution:

$$f_{T_B}(k) = \sum_i f_{T_A}(k-i) f_{\Delta T_B}(i).$$

For a combination of continuous and discrete times, the convolution between probability mass measures is used.

Given the above procedure, to compute the event time distributions at each node we start at the head nodes (i.e., nodes without parent nodes, such as nodes 1902, 1914, 1916, 1930, and/or 1932), and propagate down the graph 1900. If a node has more than one parent node (i.e., nodes 1918 and 1934), an embodiment of the described technology stores the parent node probabilities and distributions at the node and computes the probabilities and distributions at the node when all of the parent node densities have been stored. In various embodiments, the flow is propagated upwards starting at only the nodes that have no children. As the flow goes up the graph 1900, the described technology recursively calls one or more functions on each parent node to compute its probabilities and distributions. FIG. 18 depicts embodiments described below.

Figure 20A:
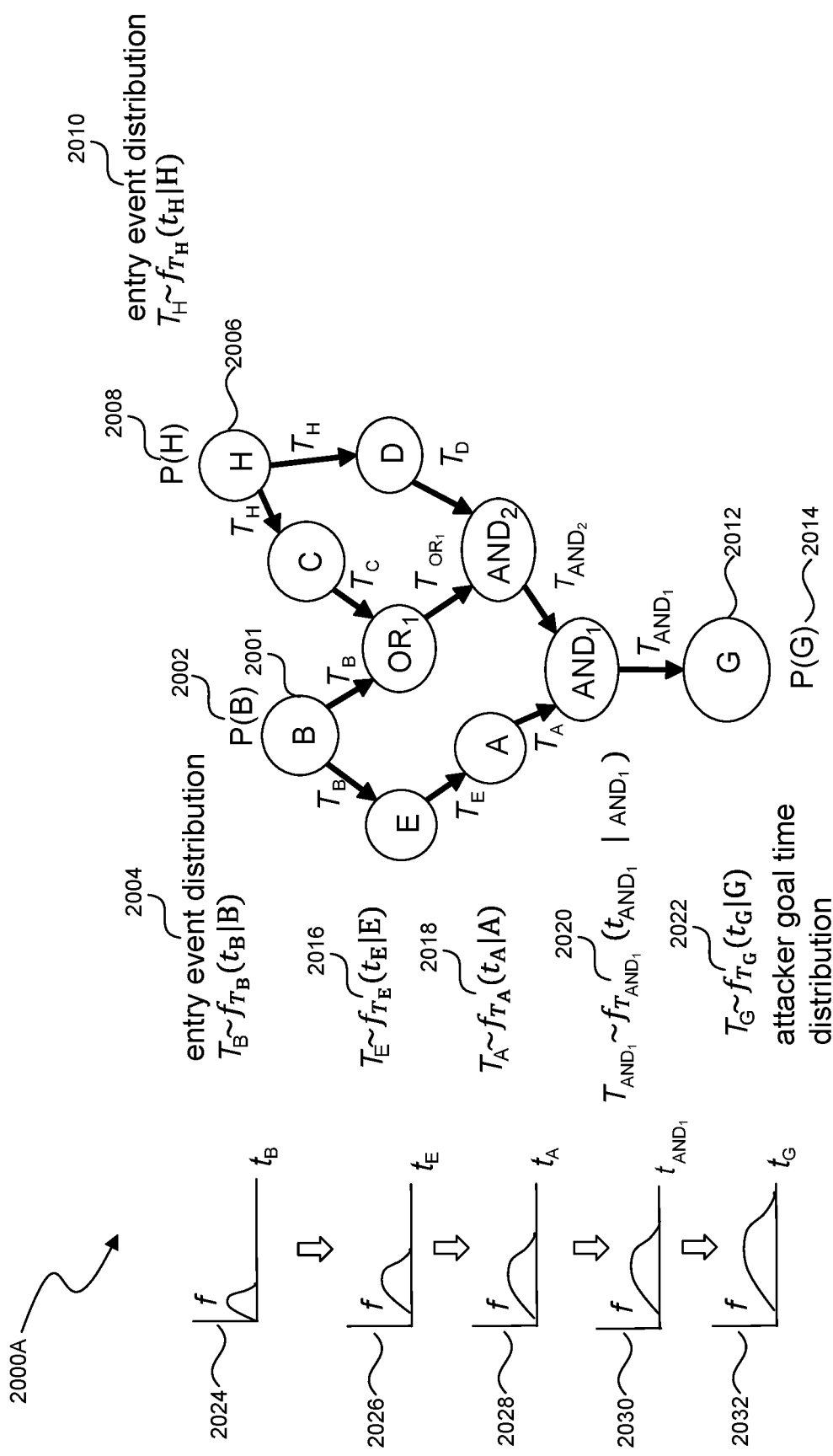
FIG. 20A depicts one or more embodiments of the described technology that propagates stationary probability distributions of event times for attacker actions and system state changes.
Figure 20B:
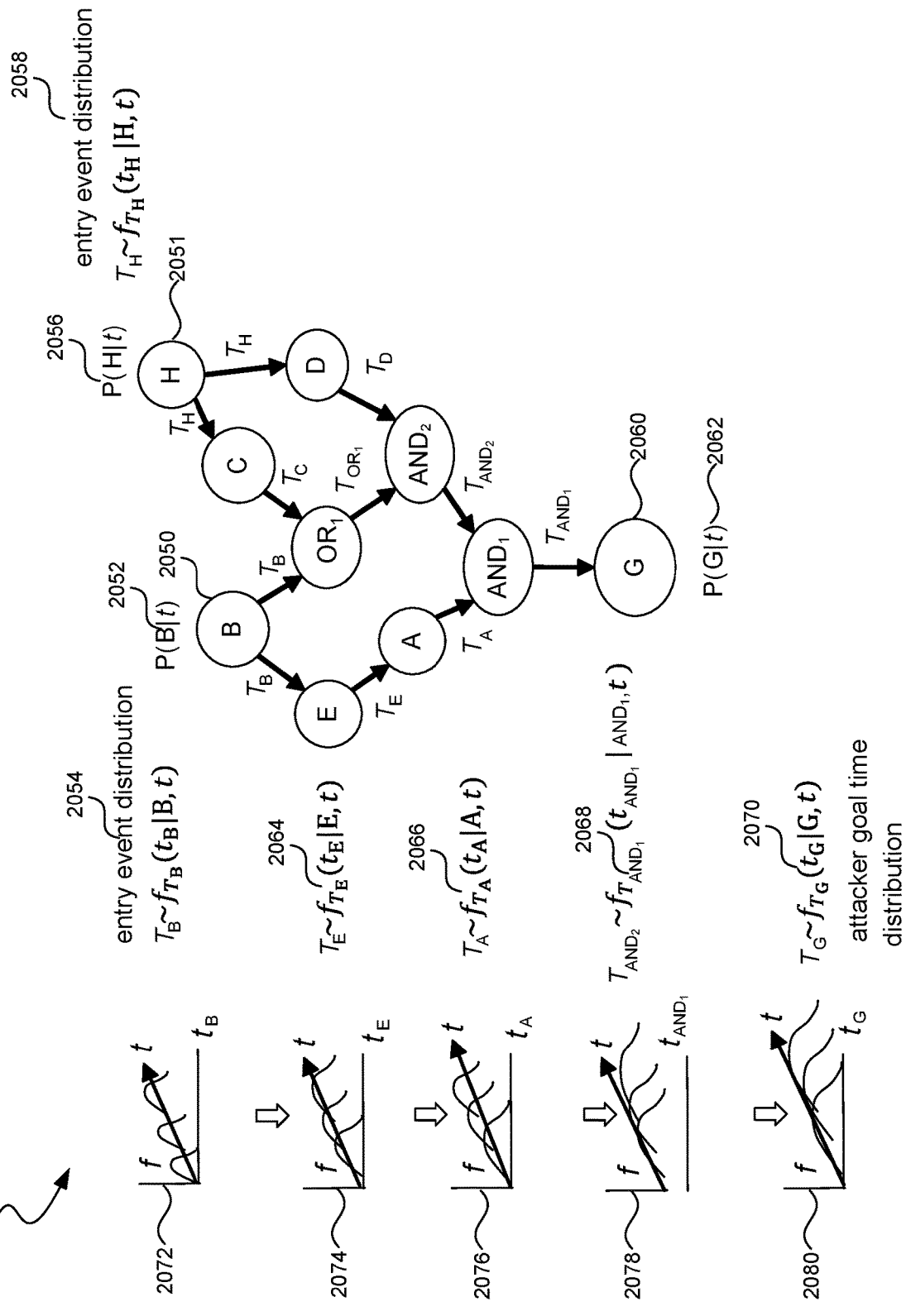
FIG. 20B depicts one or more embodiments of the described technology that propagates non-stationary probabilities and conditional distributions of event times for attacker actions and system state changes.

FIG. 20A depicts one or more embodiments of the described technology that propagates stationary probability distributions of event times 2004, 2016, 2018, 2020, and 2033 (as can be represented by their respective diagrams 2024, 2026, 2028, 2030, and 2030) for attacker actions, attacker and system state changes. Inputs 2002 and 2008 are probabilities of entry at node "B" 2001 and at node "H" 2006, and their respective conditional distributions 2004 and 2010 of event times. In one or more embodiments, the probabilities of each attacker action and system state change and respective conditional probability distribution of event times are computed by the described technology. For example, the probability 2014 and conditional distribution 2022 of when the attacker attains a goal node 2012 are computed by the described technology. The use of nodes such as "B" 2001 or "H" 2006 which do not have parent nodes, are not restricted to entry points but, in various embodiments, are also used to represent system states or properties. The propagation of event time distributions at selected nodes of the system FIG. 20B depicts one or more embodiments of the described technology that propagates non-stationary probabilities and conditional distributions of event times 2054, 2064, 2066, 2068, 2070 (as can be represented by their respective diagrams 2072, 2073, 2076, 2078, and 2080) for attacker actions and system state changes, in order to model time-varying statistics. Inputs 2052 and 2056 are time-varying probabilities of entry at nodes "B" 2050 and "H" 2051, and their respective time-varying conditional distributions 2054 and 2058, of event times. The time-varying probability 2062 and conditional distribution 2070 of when the attacker attains a goal node 2060 are computed by the described technology, such as at selected nodes [2072-2080] of the described technology, as depicted in FIG. 20B.

Figure 20C:
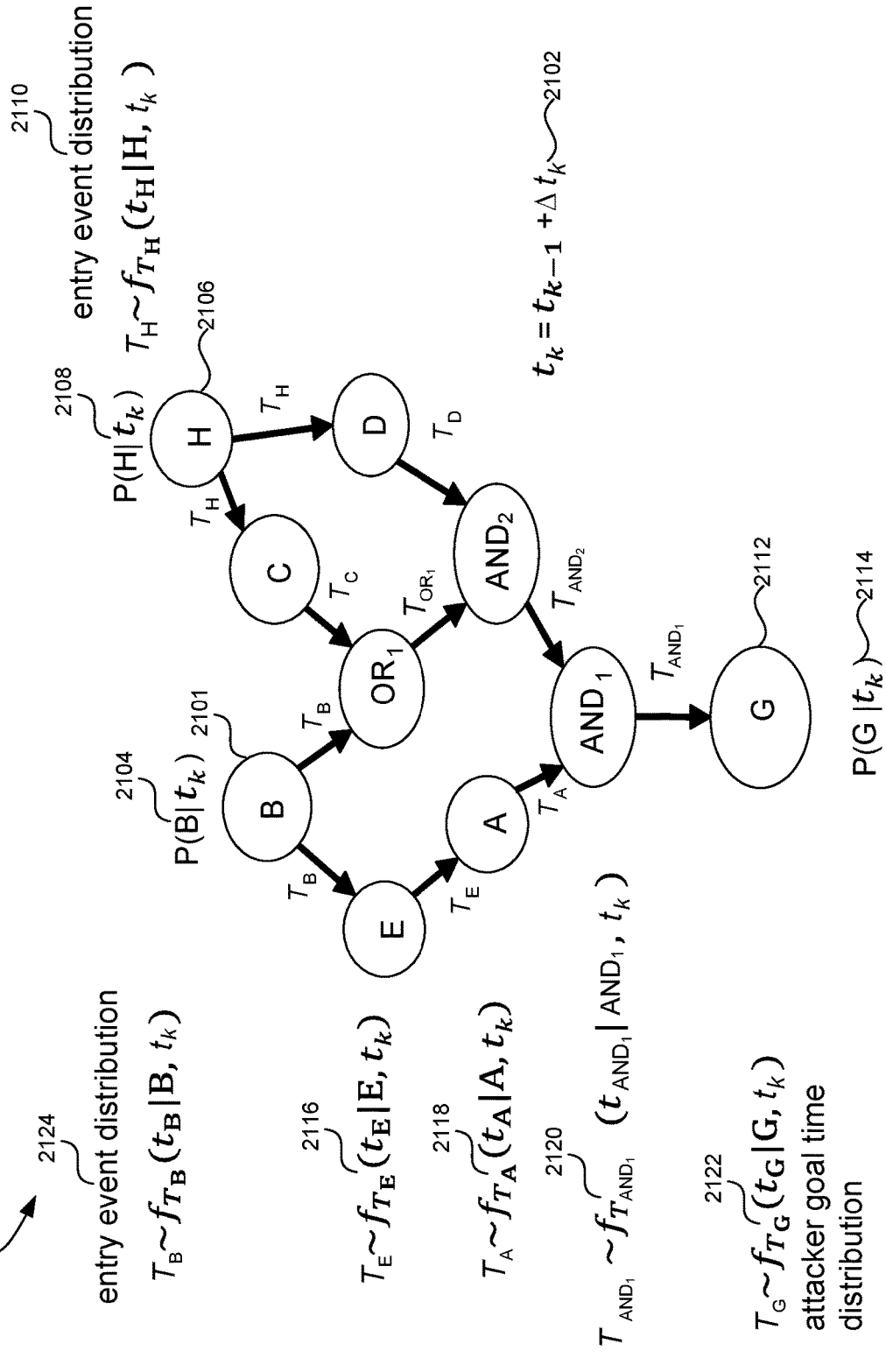
FIG. 20C depicts one or more embodiments of the described technology that propagates non-stationary probabilities and conditional distributions of event times for attacker actions and system state changes that depend on changes in probability distributions that occur at discrete time intervals.

FIG. 20C depicts one or more embodiments of the described technology that propagates non-stationary probabilities and conditional distributions of event times for attacker actions and system state changes that depend on changes in probability distributions that occur at discrete time intervals, in order to model time-varying statistics. Inputs are discrete time-varying probabilities 2104 and 2108 of entry at nodes "B" 2101 and "H" 2106, and their respective discrete time-varying conditional distributions 2124 and 2110 of event times. The discrete time-varying probability 2114 and conditional distribution 2122 of when the attacker attains a goal node 2112 are computed by the described technology.

An asset or goal is represented by a situation where the attacker reaches one or more actions or goals. One or more such actions or goals are, in some embodiments, represented by a node. In one or more embodiments, the probability that the attacker reaches an asset or a goal can be computed by the described technology at least based on one or more of the techniques described above.

Mixture Distributions Details

In one or more embodiments, the described technology uses mixture distributions to represent the event time probability distributions.

For example, consider the incoming event times $T_1$, $T_2$ to an 'OR' or 'AND' node with distributions:

$$f_{T_1}(t|E_1) = \Sigma_i a_i \varphi_i(t), \text{ and } f_{T_2}(t|E_2) = \Sigma_j b_j \psi_j(t).$$

The resulting distributions of the node are:

$$f_{T_{AND}}(t|E_1, E_2) = \Sigma_i w a_i \varphi_i(t) + \Sigma_j (1-w) b_j \psi_j(t),$$

and $$f_{T_{OR}}(t|E_1, E_2) = \Sigma_i a_{OR} a_i \varphi_i(t) + \Sigma_j b_{OR} b_j \psi_j(t),$$

where $w = F_{T_2 - T_1}(0 | E_1, E_2)$.

To compute "w," the described technology, in various embodiments first computes a density function, such as $f_{T_2 - T_1}(t|E_1, E_2)$:

$$f_{T_2 - T_1}(t|E_1, E_2) = f_{T_2}(t|E_2) * f_{T_1}(-t|E_1) = \Sigma_i \Sigma_j a_i b_j \varphi_i(t) * \psi_j(-t).$$

Therefore, $$w = \int_{-\infty}^0 f_{T_2 - T_1}(s | E_1, E_2) ds = \Sigma_i \Sigma_j a_i b_j \int_{-\infty}^0 \varphi_i(s) * \psi_j(-s) ds.$$

For a node "B", whose parent is an 'AND' node, the event time is $T_B = T_{AND} + \Delta T_B$, so that $$f_{T_B}(t \mid \text{AND}) = f_{T_{AND}}(t \mid E_1, E_2) * f_{\Delta T_B}(t) =$$

$$\sum_i wa_i\varphi_i(t) * f_{\Delta T_B}(t) + \sum_j (1-w)b_j\psi_j(t) * f_{\Delta T_B}(t).$$

For a node "B" whose parent is an 'OR' node, the event time is $t_B = t_{OR} + \Delta t_B$, so that $$f_{T_B}(t \mid \text{OR}) = f_{T_{OR}}(t \mid E_1, E_2) * f_{\Delta T_B}(t) =$$

$$\sum_i a_{OR}a_i\varphi_i(t) * f_{\Delta T_B}(t) + \sum_j b_{OR}b_j\psi_j(t) * f_{\Delta T_B}(t).$$

Starting from the nodes with no parents, the described technology of this embodiment can proceed down the tree such that a node with a computed or specified event time density function stores the density function with all of its child nodes. When a node has the density function stored for all of its parent nodes, in various embodiments, it computes its own density function.

One or more embodiments can start from the leaf nodes (i.e., nodes with no children) and call a recursive function to compute the parent node event time densities, and can use these event time densities to compute the event time density of the node.

In various embodiments, the described technology can use continuous time or discrete time or a combination of continuous and discrete time to represent the event times. This includes use of integers to represent discrete times.

Monte Carlo Method Details

In some embodiments, the described technology can use statistical or deterministic sampling techniques to propagate the time event distributions at each node. Statistical sampling does not require the assumption of statistical independence of the parent node events and times that was assumed in the previously described embodiments.

First, at each node without any parents (head node), the event time distribution and event probability must be specified.

In various embodiments, the procedure can then sample the head nodes with a probability proportional to the probabilities of their events. Events are fired down the graph starting from the selected head node until a leaf node is reached. The path can stop at a node with probability $(1-p_E)$ where $p_E$ is the event probability of the node. At each node, in various embodiments, if the path proceeds, a child node is selected with probability in proportion to its conditional probability.

In some embodiments, node event times are computed by sampling. If the node is a logical condition node, an example for event time random variable $T_B$ of the node can be:

$$T_B = \Delta T_B + T_P,$$

where $\Delta T_B$ is sampled from its distribution, and $T_P$ is the sampled event time of the single parent node.

For an 'AND' junction node, the event for node "B" is not fired until all parent nodes have fired. The node event time is:

$$T_B = \max(T_1, T_2, \ldots),$$

where $T_1$, $T_2$ are the event times of the parent nodes.

For an 'OR' junction node, $$T_B = T_k,$$

where $T_k$ is the event time of the first parent that fired. Any subsequent firing by a parent node is ignored.

As firing of nodes reaches the asset goal nodes, samples are available for the time to reach the asset goal.

The above embodiment may be inefficient since many paths stop before reaching any assets due to the non-occurrence of a node event along the way. In various embodiments that avoid this problem, the described technology continues propagation until a leaf node is reached. This corresponds to computing the event time distribution conditioned on all of the events occurring. However, to obtain a logically correct result, the described technology, in various embodiments, replaces 'OR' junction nodes by cloning the respective logical node that is the child of the junction node. If the asset goal node has a parent 'OR' node then the described technology can clone the asset goal node. For each such asset goal node "i," the described technology can keep track of the probability "$p_i$" of reaching the goal. The event time distribution of the asset goal is given by the weighted distribution over the asset goal node and its clones:

$$f(t) = \Sigma_i p_i f_i(t) / \Sigma_i p_i.$$

The described technology includes embodiments based on other well-known state-of-the-art variations in Monte Carlo techniques, such as importance sampling, Markov Chain Monte Carlo, and population Monte Carlo. The described technology includes embodiments that use other sampling methods such as Latin hypercubes.

Given computed samples of the event times for asset goals, an embodiment of the described technology associates analytic or semi-analytic functions with the sample data set by well-known regression methods.

Monte Carlo Method with N-Most Likely Paths Detail

In one or more embodiments, the described technology can use the N-most likely paths, where N>1, from a head node to an asset goal. The paths are obtained from well-known shortest path algorithms where the 'distance' function, in this case, is taken to be the sum of log probabilities of transition between nodes. The event times are then sampled along these paths by, for example, the Monte Carlo process described above. Because the number of paths is limited, the process is more efficient than sampling all paths when the number of paths is greater than N.

Direction of Propagation of Probabilities

The propagation of event probabilities and time distributions, as has been described, is performed by starting from the point of breach to the compromised asset. Breach of multiple asset points can be computed from a single propagation through the network of pathways. In some embodiments, the described technology propagates event probabilities and time distributions from asset to points of breach. In some embodiments, a combination of the two approaches is taken. In one or more embodiments, a multiple stage procedure first proceeds from breach point to locations of perceived assets and then propagates from assets to the breach point. Propagation in the network can be performed in various orders, such as forward-propagation from an entry point to perceived assets, back-propagation from asset to entry points, and combinations of the two directions.

Threat Forecasting Model

In one or more embodiments of the threat forecasting model component 310 of the described technology, given a targeted organization or organizational category, the general characteristics of likely attackers and their rates of attack in order to perform its forecasting function is input by the user or read from a file.

In various embodiments, the described technology estimates the general characteristics of attackers and rates of attack from the expected resource limitations and goals of the attacker. The resource costs of attacking a particular site are estimated by aggregating costs along likely attack pathways, as computed by the forecast model. Resource cost may depend on the attacker attributes, such as skill. For example, a highly skilled attacker would have fewer time resource costs than a less skilled attacker.

The particular goals of an attacker, in one or more embodiments, determines the likely type of targeted assets, and hence the attack pathways taken. The goals for an attacker can be determined manually and/or are determined automatically based on expert opinion and studies of attacker types and groups. The types of attacker may be formulated into categories and the selection of goals is then based on the category of the attacker.

The described technology determines interactions between different groups and between groups and hacker internet communities by including the resulting modification to their resources. Acquisition of resources, such as monetary, personnel, skills, and knowledge, for example, can be transferred between groups by sharing between collaborators or by payment to groups with services for hire.

A group may hire another group to perform attacks. Groups with similar goals may coordinate their attacks. The described technology can modify the main goal and any sequences of sub-goals leading to the main goal by either prescribing or generating coordinated plans.

The availability of resources to execute attack campaigns can also be treated based on a sequence of sub-goals. The type of campaigns specific to a threat group, in some embodiments, can be determined manually and/or automatically based on, e.g., past history and/or expert opinion.

Given a targeted organization "o," the total rate of attack at one of its entry points "e," is $$Q(o,e,u,t)=\Sigma_a Q_a(o,a,e,u,t).$$

where the sum is over all attackers "a," and "u" is the type of attack. The "Q's" are either idealized instantaneous rates or rates over some specific time of interest. Instead of the sum being over individual attackers, the sum can be over attacker categories.

In one or more embodiments, the described technology computes the attacker rate "$Q_a$" by determining which organizations "o" are selected by an attacker on the basis of the attacker's attributes, such as, the attacker's goal, type of attacker organization, the level of attacker's resources, time available, monetary funds, the number and skill level of personnel, and/or information intelligence. These and/or other attributes are used to rank an organization based on its attributes, such as assets, type of business, number of employees, level of cyber security, geographical region, and nationality.

Various embodiments of the described technology maximize a reward-cost function R(a,o,q) for attacker "a," with respect to organization "o" and attack rate "q," subject to constraints on the limits of the attacker's resources: time, money, personnel, and skills:

time $T$: $T(a,o,q) \leq T_{max}(a)$, money $M$: $M(a,o,q) \leq M\max(a)$, personnel number $P$: $P(a,o,q) \leq P\max(a)$, skill set index $S$: $S(a,o,q) \leq S\max(a)$.

The resources T(a,o,q), M(a,o,q), P(a,o,q), and S(a,o,q) can be computed by aggregating values computed along attacker action pathways within the forecast model applied to organization "o" for attacker "a." The expected values of the functions can be determined by the described technology by, for example, weighting with the node probabilities to estimate the entire cost of a successful attack on organization "o," in order to find the characteristics of the most attractive organization for the attacker and corresponding attack rate $q=q_{opt}(a,o)$.

The reward-cost function can include the goals of the attacker, expected benefits of reaching the goals, probability of detection, and resource costs.

The resource limitation values $T_{max}(a)$, $M_{max}(a)$, $P_{max}(a)$, and $S_{max}(a)$ can be estimated manually and/or automatically, e.g., based on expert opinion or studies of attackers and their groups.

Some embodiments of the described technology include other equivalent or approximate mathematical descriptions of the optimization problem, including algebraic manipulation or the use of barrier, or penalty, functions.

For collaboration between groups or attacks for hire, the resource limitation values can be modified to account for transfer of resources. The reward-cost function R(a,o,q) can be modified to account for shared goals or coordinated sequences of sub-goals.

The described technology is not limited to the above resource types, but other limitations or constraints can be used.

The maximization can be performed by means of state-of-art methods in the field of constrained optimization methods.

The described technology is not restricted to the above embodiments, but is applicable to any technique where reward-cost decision-making and resource limitations of the attacker are considered, together with interaction between groups.

The above embodiment assumed a single type of attack. In order to forecast the particular type of attack from a range of possible attack types, the embodiment maximizes the reward-cost function:

$$R(a,o,q)=\Sigma_u \beta_u R_u(o,a,q_u), q=(q_{u_1},q_{u_2},\ldots),$$

where the sum is over possible exploit vectors u, and $\beta_u$'s are the proportion of exploits. The maximization is done, in various embodiments, with respect to the target organization "o," the proportion of exploits, and the rates "q." Preferred attack types for known groups can be modeled using weights that multiply the proportion of exploits, and/or that modify the reward-cost function of an exploit type.

Since an attacker cannot completely foresee the actual resources that will be used, nor the rewards, adjustable weights multiplying the constraints can be used by the described technology to forecast suboptimal attacker behavior by either increasing or decreasing resource costs, on the basis of underestimation or overestimation of costs, respectively, by the attacker. These weights can be fixed or sampled from a probabilistic distribution in a Monte Carlo procedure, for example.

After the targeted organization "o" is found, the resource limitations are, in various embodiments, decreased by the described technology based on computed costs for the organization, and the maximization procedure can be performed again. This is repeated until there are limited or no organizations that meet the resource constraints. The result is a ranking of the preferred targets for the attacker and their attack rates.

To treat resource costs and resource limitations probabilistically, the above procedure can be repeated by means of a Monte Carlo procedure, where resource costs and limitations are sampled from their distributions. The result is a probabilistic ranking of preferred targets.

The reward-cost to an attacker can be computed for multiple stages during an attack. For example, it is possible that very little skilled resources are spent on gaining entry because of automation, whereas, more resources are needed to search within the network for desired assets. An example of multiple stages includes an early reconnaissance stage, an asset exploitation stage, a hibernating stage, and/or a secondary exploitation. The reward-cost function computed for each stage can then be aggregated for use in the optimizing step. The constraint functions are, in some embodiments, computed for each stage by means of the forecast model and aggregated. The computation of the optimum organization o is done as described for a single stage.

A similar procedure is applied to categories of organizations instead of specific organizations, as follows. The attacker attributes and attack rates can be input from the user and/or dynamically read from a file for categories of targeted organizations. In various embodiments, the described technology computes the attack rates by the following procedure: Let "$n_O$" be the number of organizations of category "O" being attacked by attacker "a" in some specific time span of interest over which the constraints are given.

A possible reward-cost function is "$n_O$"·R(a, O, q), which is maximized with respect to the variables organization category "O", "$n_O$", and "q," subject to the constraints:

time $T$: $n_O \cdot T(a,O,q) \leq T_{max}(a)$, money $M$: $n_O \cdot M(a,O,q) \leq M_{max}(a)$, personnel number $P$: $n_O \cdot P(a,O,q) \leq P_{max}(a)$, skill set index $S$: $n_O \cdot S(a,O,q) \leq S_{max}(a)$.

If the maximum number of organizations of category "O" is less than the optimum "$n_O$," we take "$n_O$" to be the maximum instead and redo the optimization, but with the optimum category "O" removed and the resource constraints reduced by the computed cost. This can be continued until at least one of the constraints is exceeded. Other functions and constraints can be used instead.

State-of-art optimization algorithms such as linear programming and steepest descent methods can be used to perform the maximization.

The resource costs T(a,O,q), M(a,O,q), P(a,O,q), and S(a,O,q) are determined by aggregating values computed along attacker action pathways within the forecast model, as applied to input for an organization of category "O" and attacker "a."

Probabilistic resource costs and/or resource limitations can be treated probabilistically, the above procedure can be repeated by means of a Monte Carlo procedure, where resource costs and limitations are sampled from their distributions. The result is a probabilistic ranking of preferred target categories.

The rate of attack for an organization "O" from the attacker category can be determined from the number of attackers in the attacker category, the values of "$n_O$" computed from the above description, and rate "q" for the typical organization in the category.

The reward-cost to an attacker accumulates over multiple stages. In various embodiments, the reward-cost function computed for each stage and aggregated is used in the optimizing step. The constraint functions are computed for each stage by means of the forecast model and summed. The computation of optimum "$n_O$" and "O" is done as described above for a single stage.

Instead of computing attack rates for specific attackers, an embodiment of the described technology can use the same procedure as above to specify and/or to compute attack rates for categories of attackers. Computation of attack rates are from maximizing the reward-cost function of an attacker which is a function of the attributes of its containing attacker category.

The mathematical formulations for determining attack rates and the most likely organizations targeted by the attacker used in the described technology are not restricted to the above embodiments. These formulations can use other methods to perform this function, such as cross-ranking by visual examination of tables or by heuristic methods to perform approximate maximization of attacker reward-cost tradeoff with respect to target organizations and attack rates.

Forecasting Detailed Attack Behaviors

Accurate forecasting of the risk to a network system and forecasting of the likelihood that the attack is detected at different stages by estimating the probabilities of an attacker's actions. In the case of a breach, this may include how the attacker moves within the system. In the case of a denial-of-service attack that is executed from outside the targeted system, this could include the steps to commandeering a botnet. FIG. 19 highlights attack behaviors in a network.

Figure 21:
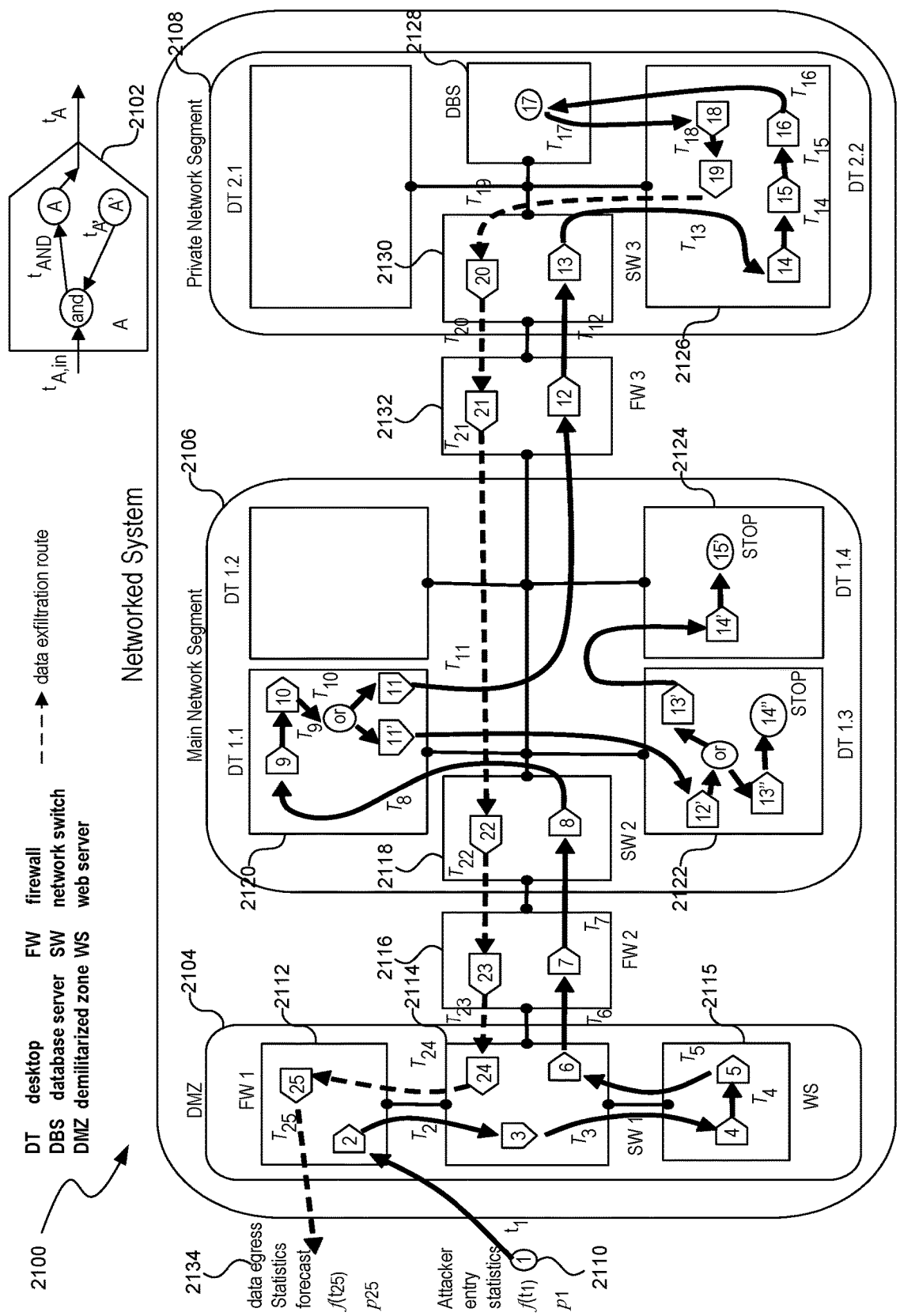
FIG. 21 depicts example attacker distributions that are forward-propagated through a complex enterprise network with a layered defense, containing a demilitarized zone (DMZ), network segments, network boundary controls, and security countermeasures to both detect and contain an attacker in their attempt to damage assets, according to an embodiment of the described technology.

FIG. 21 depicts example attacker distributions 2100 that are propagated through a complex enterprise network with a layered defense, containing a demilitarized zone (DMZ) 2104, network segments 2106 and 2108, network boundary controls 2112, 2116, 2132 and security countermeasures to both detect and contain an attacker in their attempt to damage assets, according to an embodiment of the described technology. Each event element 2102 consists of optional one or more probabilistic system states or logical conditions that is 'OR'ed with the preceding probabilistic event or precondition element. The input distributions are the probability of entry and time of entry 2110, and the system states or logical conditions within the elements. The output distribution is the probability and time of data exfiltration 2134. In various embodiments, the distributions are back-propagated starting from the compromised asset to entry instead of entry to asset.

The asset is on a database server 2128. The attacker enters the DMZ through the firewall 2112 by accessing a webserver 2115. After compromising the webserver 2115, the attacker enters the main network segment 2106 through the firewall 2116 and breaches the desktop DT 1.1 2120. From there, a possible pathway is to enter desktop DT 1.3 2122 and then DT 1.4 2124. Another pathway is to enter the private network segment 2108 by breaching desktop DT 2.2 2126. From there, the attacker steals data from database server 2128 and transmits to outside the network. The propagation of event time distributions gives the desired time at each event, including at the point of theft at the database server 2128 and exit 2134.

The described technology, in various embodiments, applies the threat forecasting model component 310 in order to first compute the accumulated reward-cost to the attacker along likely potential event pathways. Non-limiting examples of cost include the time required to execute steps, skills required, number of personnel needed, and money available. Non-limiting examples of reward are how much and how close the attacker is to achieving asset damage or a sub-goal. This depends on the amount of information that the attacker gains progressively along pathways. The described technology uses the pathway reward-costs in order to determine the likelihood that the attacker takes one or more pathways.

The described technology, in some embodiments, determines the likelihood of attacker pathways by examining propagation along attacker pathways to incorporate those segments which branches from a common parent segment. The probability that an attacker will choose a branch segment is its reward-cost which is computed along all sub-paths starting at that segment. The probability can be based at least on the branch reward-cost value and any modifications to this value from taking into account, for example, the available attacker resources, time, skills, and/or knowledge accumulated up to the time before reaching the branch segment.

If the above sub-path computations are performed all of the way to the asset goal segments, one or more embodiments perform the basic calculation starting from the asset goal nodes of the underlying graph and propagating up. Values from this computation may be stored along nodes and used to perform the final reward-cost value based on attacker attributes and accumulated knowledge.

In some embodiments, the described technology starts the upward propagation from nodes that are NL-link distances away from the current node. A value of $N_L=0$ specifies a random path selection (equal probability). The value of $N_L$ is zero or one for an unskilled attacker and is increased for a skilled attacker on the basis of data or expert opinion.

Instead of a single goal, such as asset damage, an attacker can behave in stages with each stage having a sub-goal. For example, in a reconnaissance stage the attacker sub-goal is to obtain knowledge of network topology and location of data servers. In a harvesting stage, the attacker has the sub-goal to infect other computers in the system with malware. The described technology handles such cases by breaking the forecasting into stages with the goal in the described algorithm replaced by the sub-goal at each stage.

An attacker that gained access to a site once before and then was shut off is likely to have more knowledge of the site than a first-time attacker. The described technology considers this increased knowledge in computing the reward-cost function of pathways, so that the attacker is more likely to select pathways that connect to assets. In other embodiments, the distributions are back-propagated starting from the compromised asset to entry instead of entry to asset.

Forecasting Detailed Attacker State Based on Information Feeds

Accurate forecasting of the progressing likelihood of the state of compromise of an organization's network system based on on-site live information feeds can improve detection at different stages of attack. This requires updating the probabilities describing an attacker's likely actions within the network on a continuous basis. In the case of a breach, this provides quantitative mapping of how the information and observables recorded in the system contribute to assessing various stages and pathways that the attacker could move within the system and the consistency with observables this attack sequence generates.

On a continuing basis, as new information (e.g., alerts, addresses accessed) becomes available, the detection engine model component 602i of the described technology, in one or more embodiments, uses the new information to recompute accumulated reward-cost and pathways in the pathways likelihood, cost & time 602e in order to update the likely potential event pathways. Examples of cost can include the time required to execute steps, skills required, number of personnel needed, and money available. Examples of reward are how much and how close the alerts indicate the attacker is to achieving the entire path towards asset damage or a sub-goal. The described technology, in some embodiments, uses the pathway reward-costs in order to compute and update the likelihood that the attacker takes the pathway.

In the described technology, the probabilistic forecast detector prunes attack pathways that have sufficiently low likelihood values computed from information from the network, for example, alerts, traffic, and other data to allow scalability of the algorithm.

In the described technology, near real-time stream processing of input data (e.g., alerts, traffic, other information) is only kept for a moving window of time whose duration depends on the forecast time for the attacker to carry out different stages of the attack and the interdependence of the timing of attacks in different parts of the network.

FIG. 22 depicts a chart 2200 related to on-site security live or periodic data feed driven solutions as part of an organization's security posture to mitigate loss. Chart 2200 lists examples of embodiments of the described technology including improved detection through lowered false alarm rates, location of the network breach, forecasting of time to bring in breach-response teams, and forecast pathways of the attacker when responding and containing the attack.

The probability distributions that are within both the site and threat models can be progressively updated from continuous and periodic data feeds and expert opinion. These distributions can be categorized into those that apply to events that are observable as to their occurrence or to events that are not directly observable, meaning they generate no discernable information that allows the action to be viewed with the security control measures, methods and systems associated with the site.

Distributions for events that are directly observable are, in one or more embodiments, estimated from data by well-known methods of statistical estimation of probability distributions, such as hierarchical Bayesian updating of parameter distributions where the initial distribution is based on a prior distribution.

Distributions corresponding to events that are not directly observable are, in one or more embodiments, calibrated based on comparing model forecasts with the actual observed events to estimate the likelihood of events that are not observable.

An embodiment of distributions for unobserved events where direct detection is not possible pertains to updating the likelihood of events along a potential attacker pathway. Calibration of these events based on data feeds from on-site sensors and security analyst feedback for a subset of events along the pathway will confirm that the likelihood of an attack along the pathway is greater than or less than a given threshold.

Figure 23:
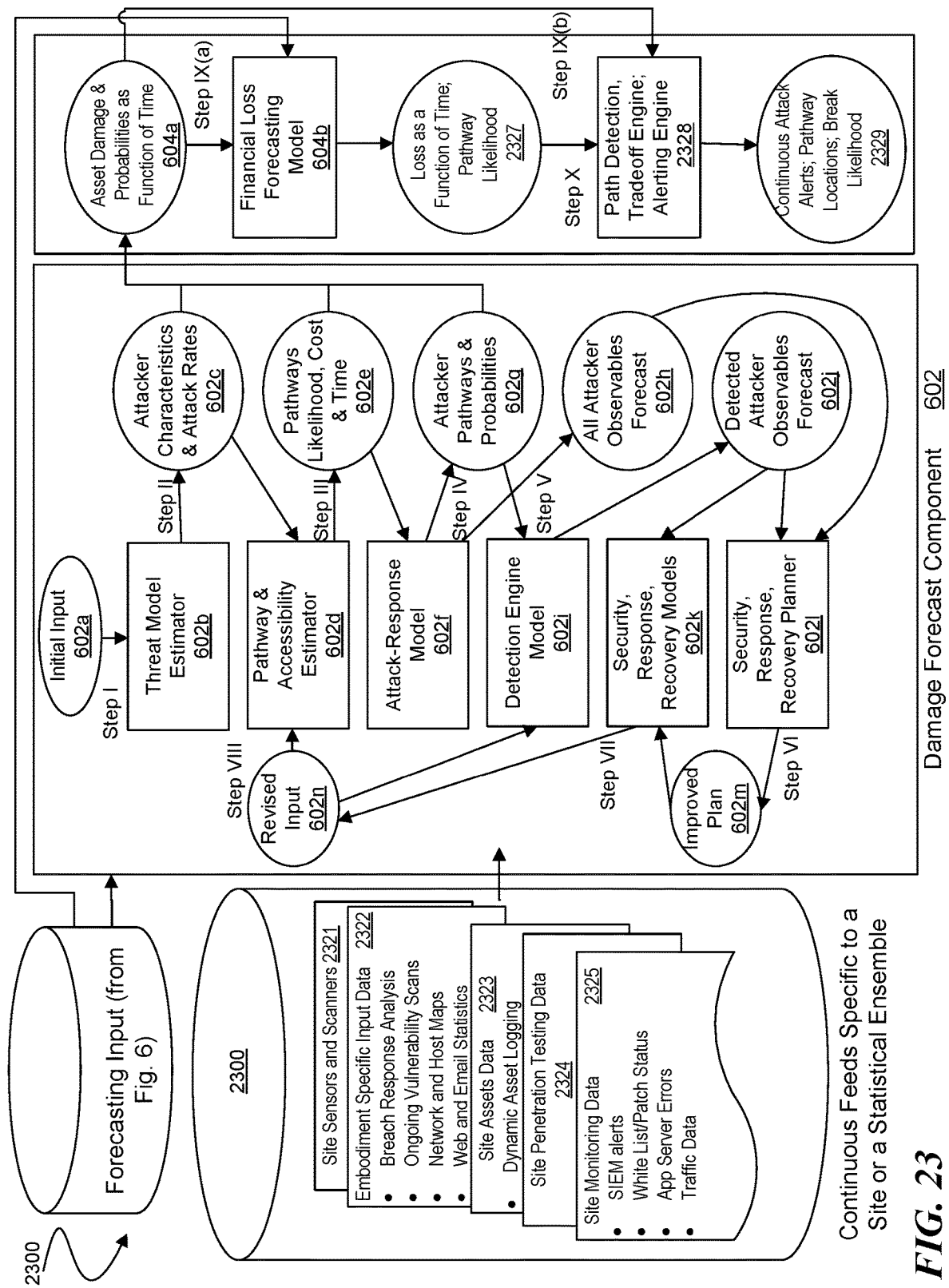
FIG. 23 depicts block diagram sequencing in an on-site security application embodiment of the described technology.

FIG. 23 depicts a block diagram 2300 that depicts an example of detailed sequencing in an on-site security application embodiment of the described technology. In block diagram 2300, different network and security information, security alerting, external security information and/or other data is input to the forecasting engine. The described technology updates the probability of different attack pathways to provide low false alarm alerts of compromise of the network systems, improved breach detection, current and forecasted future location of the attacker, identification of the attack sequence underway, and improved response times to contain and reduce loss from an attacker.

Block Diagram 2300 depicts the described technology operating on network system and other information feeds from the organization that are used by the described technology to update the forecast of the state of attackers in that enterprise network. Block diagram 2300 is, in various embodiments, a node that provides an update based on the likelihood of detecting input observables that imply given pathways of an attacker and their sequence of observables. FIG. 23 is similar to FIG. 6, so each element is not explained in detail in reference to FIG. 23. In one or more embodiments, subcomponents 2321-2325 perform on-line data collection of time-varying site information from sensors, scanners, security appliances, and/or security information management systems about the network topology, connected devices, breach attempts, site vulnerabilities. Information can also be collected based on changes to asset type and location. In some embodiments, information from human and automated penetration testing is also collected. This information is used by the financial loss forecasting component 604 to update probabilities of pathways progressively across expected attack pathways, and a likelihood of attacker paths is continuously generated as data is received. The probability changes are driven by one or more factors, such as the deviation of the forecasted events with their actual occurrence or non-occurrence at the site as monitored by onsite data collection, changes in expert opinion, and changes in the site system including configuration. This continuous or periodic update of likely attack pathways can generate a range of benefits to the organization. For example, it can provide attacker pathway state detection, forecast of attack pathways and assets damaged to guide security response, improved incident response decision making, and the ranking and deployment of security products to best mitigate attack sequences that can lead to the largest loss over different time periods (see FIG. 3, 322-330n). In Step X of FIG. 23, the path detection tradeoff engine and/or alerting engine component 2328 includes technology to integrate asset loss estimates with attacker detection to provide attack alerts that minimize the cost of false detections and expected financial loss.

One of more of subcomponents 2321-2325 can be implemented on an onsite and/or remote security appliance or other computing device capable of communicating information to the network.

Conclusion

In general, the detailed description of embodiments of the described technology is not intended to be exhaustive or to limit the described technology to the precise form disclosed above. While specific embodiments of, and examples for, the described technology are described above for illustrative purposes, various equivalent modifications are possible within the scope of the described technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the described technology provided herein can be applied to other systems, not necessarily the system described herein. The elements and acts of the various embodiments described herein can be combined to provide further embodiments.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.).

The term "logic," as used herein, can include, for example, special-purpose hardwired circuitry, software and/or firmware in conjunction with programmable circuitry, or a combination thereof.

These and other changes can be made to the described technology in light of the above Detailed Description. While the above description details certain embodiments of the described technology and describes the best mode contemplated, no matter how detailed the above appears in text, the described technology can be practiced in many ways. The described technology may vary considerably in its implementation details, while still being encompassed by the described technology disclosed herein. As noted above, particular terminology used when describing certain features or aspects of the described technology should not be taken to imply that the terminology is being redefined herein to be restricted to any specific characteristics, features, or aspects of the described technology with which that terminology is associated. In general, the terms used in the following claims should not be construed to limit the described technology to the specific embodiments disclosed in the specification, unless the above Detailed Description section explicitly defines such terms. Accordingly, the actual scope of the described technology encompasses not only the disclosed embodiments, but also all equivalent ways of practicing or implementing the described technology.

To reduce the number of claims, certain aspects of the described technology are presented below in certain claim forms, but the applicant contemplates the various aspects of the described technology in any number of claim forms. For example, while only one aspect of the described technology is recited as a means-plus-function claim under 35 U.S.C § 112, ¶ 6, other aspects may likewise be embodied as a means-plus-function claim, or in other forms, such as being embodied in a computer-readable medium. (Any claims intended to be treated under 35 U.S.C. § 112, ¶ 6 will begin with the words "means for," but use of the term "for" in any other context is not intended to invoke treatment under 35 U.S.C. § 112, ¶ 6.) Accordingly, the applicant reserves the right to pursue additional claims after filing this application to pursue such additional claim forms, in either this application or in a continuing application.

We claim:

1. A method estimating risks related to threats to a networked system of at least one target organization, the method comprising:
   receiving, by a processor, one or more target organization information, asset information, system information, and threat information descriptive of at least one target organization;
   calculating, by the processor, threat characteristics for the networked system of the at least one target organization, based on the one or more target organization information, asset information, system information, and threat information descriptive of the at least one target organization;
   modeling, by the processor, one or more pathways for at least one of the threats based on the calculated threat characteristics for the networked systemof the at least one target organization, wherein the one or more pathways includes at least one time-dependent event,
   wherein at least one of the one or more pathways includes known and modeled attack agent objectives, attacker attributes, attack tactics and techniques, and time-related interactions of one or more attackers or attack behaviors and one or more sets of response actions of the at least one target organization,
   wherein the one or more sets of response actions of the at least one target organization includes:
      effects of automatic security control measures within the networked system; and
      human responses modeled by computing probabilities as a function of reward-cost from an attacker's perspective and from a targeted organization's perspective;
   estimating, by the processor, for the one or more pathways:
      probabilities that at least one of the time-dependent events will occur, and
      probability distributions of times of occurrence of the at least one time-dependent events; and
   determining, by the processor, based on the estimating, a probability distribution of damage to assets of the at least one target organization and a probability distribution of one or more times of such damage to the assets; and
   dynamically reconfiguring or deploying operation of one or more hardware components of the networked system at the one or more pathways bases on the determined probability distribution of damage to the assets and the probability distribution of one or more times of such damage to the assets,
   wherein reconfiguring or deploying operation of one or more hardware components of the networked system includes reconfiguring or deploying a firewall, security device, or sensor with respect to the one or more pathways.

2. The method of claim 1, further comprising generating a report based on the modeling, wherein the report includes information for increasing the likelihood of detection of a threat at the at least one target organization, wherein the threat information characterizes exploits, vulnerabilities, or cyber threats to the networked system, wherein the cyber threats include intentional attacks, accidents, and system failures.

3. The method of claim 1, wherein receiving the asset information characterizing assets of the at least one target organization includes obtaining information describing tangible or intangible assets that are available through the networked system, wherein existing and future cyber-related behaviors are modeled in hierarchical levels of cyber threat information, wherein partially known cyber threat information at a first level is dynamically aggregated with other known or partially known threat information as the other known or partially known cyber threat information is discovered, wherein the aggregated threat information is represented as a second level of cyber threat information, wherein the second level of cyber threat information is metadata for improving resolution of the modeling, and wherein portions of the results of the modeling are indicated in a report.

4. The method of claim 1, further comprising establishing a probability distribution of financial values based on a determination of loss of one or more assets of at the least one target organization based on occurrence time, types and amounts of damage to the one or more assets.

5. The method of claim 1, wherein receiving the system information characterizing the networked system includes obtaining information about a location, type, and configuration of one or more assets associated with the networked system.

6. The method of claim 1, wherein receiving the system information characterizing the networked system includes obtaining information about one or more security policies or procedures.

7. The method of claim 1, wherein the probability distribution of damage to assets is a probability distribution of the occurrence time, the types, and amounts of assets of the least one target organization, wherein the probability distribution of damages to assets includes a probability of loss of access to services, assets, or data associated with the networked system.

8. The method of claim 1, wherein the probability of damage to assets of at the least one target organization includes a probability of loss of goodwill, reputation, or business, including the time of such loss.

9. The method of claim 1, further comprising calculating a financial loss from the damage, based on the determining of the probability of damage to the assets, including the time of such loss.

10. The method of claim 1, further comprising modeling and estimating: probabilities of one or more pathways for responding to the threats, threat remediation actions of security personnel or software, and probability distributions of times for responding to the threats with at least one of the remediation actions.

11. A non-transitory computer-readable storage medium storing instructions that, if executed by a processor of a computing system, cause the computing system to perform a method for estimating risks related to threats to a networked system of at least one target organization, the method comprising: receiving one or more target organization information, asset information, system information, and threat information descriptive of at least one target organisation;
   calculating threat characteristics for the networked systems the at least one target organization, based on the one or more target organization information, asset information, system information, and threat information descriptive of the at least one target organization;
   modeling one or more pathways for at least one of the threats based on the calculated threat characteristics for the networked system of the at least one target organization, wherein the one or more pathways includes at least one time-dependent event, wherein at least one of the one or more pathways includes known and remodeled attack agent objectives, attacker attributes, attack tactics and techniques, and a time-related interactions of one or more attackers or attack behaviors and one or more sets of response actions of the at least one target organization, wherein the one or more sets of response actions of the at least one target organization includes:
  effects of automatic security control measures within the networked system; and
  human responses modeled by computing probabilities as a function of reward-cost from an attackers perspective and from a targeted organization's perspective:
estimating for the one or more pathways;
  probabilities that at least one of the time-dependent events will occur, and
  probability distributions of times of occurrence of the at least one time-dependent events; and
determining based on the estimating, a probability distribution of damage to assets of the at least one target organization and a probability distribution of one or more times of such damage to the assets; and
dynamically reconfiguring or deploying operation of one or more hardware components of the networked system at the one or more pathways based on the determined probability distribution of damage to the assets and the probability distribution of one or more times of such damage to the assets,
wherein reconfiguring or deploying operation of one or more hardware components of the networked system includes reconfiguring or deploying a firewall, security device, or sensor with respect to the one or more pathways.

12. The non-transitory computer-readable storage medium of claim 11, wherein the modeling includes determining risk probability distribution effects of cyber threats to the networked system of the target organization, wherein the model is a hierarchical model, wherein the hierarchical model has different levels of detail and dynamically augmented in response to receiving new data relating to the networked system of the target organization, wherein one or more attacker pathways are determined based on at least one of the cyber threat events, and wherein the risk probability distribution effects are based on target organization characteristics and attacker characteristics.

13. The non-transitory computer-readable storage medium of claim 12, wherein the target organization characteristics include: targeted physical and virtual network configuration, devices, and software, security control mitigation measures, including one or more physical access and network based measures, a likelihood of detecting attack events, insider threats, and targeted tangible and intangible assets.

14. The non-transitory computer-readable storage medium of claim 12, wherein the attacker characteristics include one or more of: a number of attackers, attacker goals and sub-goals, threat types based on asset attractiveness, attacker techniques, attack rates, or attack campaign tactics, and resource limitations, including one or more of capital, number of personnel, expertise, and time available to execute an attack on the target organization.

15. The non-transitory computer-readable storage medium of claim 11, further comprising determining probabilities of one or more vulnerabilities of, security control measures of, or trust relationships with one or more other organizations.

16. The non-transitory computer-readable storage medium of claim 11, wherein the propagating of probabilistic distributions of events overtime through the model includes forecasting cumulative effects of threat characteristics via multiple attack pathways.

17. The non-transitory computer-readable storage medium of claim 16, wherein forecasting cumulative effects of threat characteristics via multiple attack pathways includes computing accumulated rewards and costs to the attacker along multiple potential event pathways.

18. The non-transitory computer-readable storage medium of claim 11, wherein the estimating of the probability distributions of times of occurrence of the at least one time-dependent events includes stochastic forecasting of loss-generating attack pathways.

19. The non-transitory computer-readable storage medium of claim 11, further comprising pricing expected losses over fixed and varying periods of time.

20. The non-transitory computer-readable storage medium of claim 11, wherein the determining of a probability distribution of damage to assets of the target organization over a period of time includes propagating event-time distributions to forecast losses varying as a function of time based on uncertain vulnerabilities, exploits, system components, or security control measures, and determining a tradeoff between forecasts of a cost and effectiveness of possible security control options.

* * * * *